United States Patent [19]
Windel et al.

[11] Patent Number: 5,805,711
[45] Date of Patent: Sep. 8, 1998

[54] METHOD OF IMPROVING THE SECURITY OF POSTAGE METER MACHINES

[75] Inventors: Harald Windel; Frank Reisinger; Claus Freytag; Ralf Kubatzki; Marcus Hansel; Stephan Günther; Enno Bischoff; Andreas Wagner; Olav A. Zarges; Arndt Berthold; Peter Rieckhoff, all of Berlin, Germany

[73] Assignee: Francotyp-Postalia AG & Co., Birkenwerder, Germany

[21] Appl. No.: 525,923

[22] Filed: Sep. 8, 1995

Related U.S. Application Data

[63] Continuation-in-part of Ser. No. 346,909, Nov. 30, 1994, Pat. No. 5,671,146.

[30] Foreign Application Priority Data

Dec. 21, 1993 [DE] Germany ............................ 43 44 476.8

[51] Int. Cl.⁶ .................................................... H04L 9/00
[52] U.S. Cl. ................................. 380/55; 380/2; 380/4; 380/23; 380/25; 380/49; 380/50; 380/51; 705/401; 705/405; 705/408; 705/410
[58] Field of Search ............................. 380/2, 4, 23, 24, 380/25, 49, 50, 51, 55, 59; 364/464.11, 464.14, 464.15; 705/401, 405, 408, 410

[56] References Cited

U.S. PATENT DOCUMENTS

| | | |
|---|---|---|
| 3,255,439 | 6/1966 | Simjian . |
| 4,129,302 | 12/1978 | Stone . |
| 4,251,874 | 2/1981 | Check, Jr. . |

(List continued on next page.)

FOREIGN PATENT DOCUMENTS

| | | |
|---|---|---|
| 0 388 839 | 9/1990 | European Pat. Off. . |
| 0 388 840 | 9/1990 | European Pat. Off. . |
| 0 194 660 | 3/1992 | European Pat. Off. . |
| 0 516 403 | 12/1992 | European Pat. Off. . |
| 0 547 922 | 6/1993 | European Pat. Off. . |
| 0 576 113 | 12/1993 | European Pat. Off. . |
| 0 578 042 | 1/1994 | European Pat. Off. . |
| 0 647 925 | 4/1995 | European Pat. Off. . |
| 2 233 937 | 1/1991 | United Kingdom . |

OTHER PUBLICATIONS

"Asymmetrische Verschlüsselung auf der Chipkarte," Drews et al., Design & Elektronik vol. 4, Feb. 16, 1993, pp. 76–81.
"Damit Geheimdaten vertraulich bleiben—Verschlüsselungsalgorithmus IDEA löst DES ab," Brüggemann et al., Elektronik, vol. 10 (1993) pp 84–93.

Primary Examiner—Bernarr E. Gregory

[57] ABSTRACT

A method for securing data and program code of an electronic postage meter machine against manipulation, having a microprocessor in a control unit of the postage meter machine for implementing steps for a start and initialization routine and following system routine with a possibility of entering into a communication mode with a remote data central, as well as further input steps in order to enter into a franking mode from which a branch is made back into the system routine after the implementation of an accounting and printing routine, includes conducting a start security check within the framework of a start and initialization routine which runs before a secure printing data call routine and the following system routine for determining the validity of a program code and/or of data in the predetermined memory location and of an appertaining MAC (message authentification code) that is present in the same storage medium. The check for valid program code and/or for validity of the data is implemented with a selected checksum method within an OTP (one time programmable) processor that internally receives the corresponding program parts. Transfer of the postage meter machine into the aforementioned system routine takes place given validity of the data or transfer of the postage meter machine into a first mode when the data are invalid, or when a specific manipulation criterion is met. Steps for preventing the franking or blocking of the postage meter machine and/or steps for preventing a further program execution or a program branch exiting the OTP processor within the framework of system routine the occur.

18 Claims, 10 Drawing Sheets

U.S. PATENT DOCUMENTS

| | | |
|---|---|---|
| 4,347,506 | 8/1982 | Duwel et al. . |
| 4,549,281 | 10/1985 | Eckert et al. . |
| 4,746,234 | 5/1988 | Harry . |
| 4,785,417 | 11/1988 | Obrea . |
| 4,811,234 | 3/1989 | Storace . |
| 4,812,965 | 3/1989 | Taylor . |
| 4,812,994 | 3/1989 | Taylor et al. . |
| 4,864,506 | 9/1989 | Storace . |
| 5,077,660 | 12/1991 | Haines et al. . |
| 5,181,245 | 1/1993 | Jones . |
| 5,243,654 | 9/1993 | Hunter . |
| 5,572,429 | 11/1996 | Hunter et al. ............... 364/464.14 |
| 5,638,442 | 6/1997 | Gargiulo et al. ...................... 380/2 |

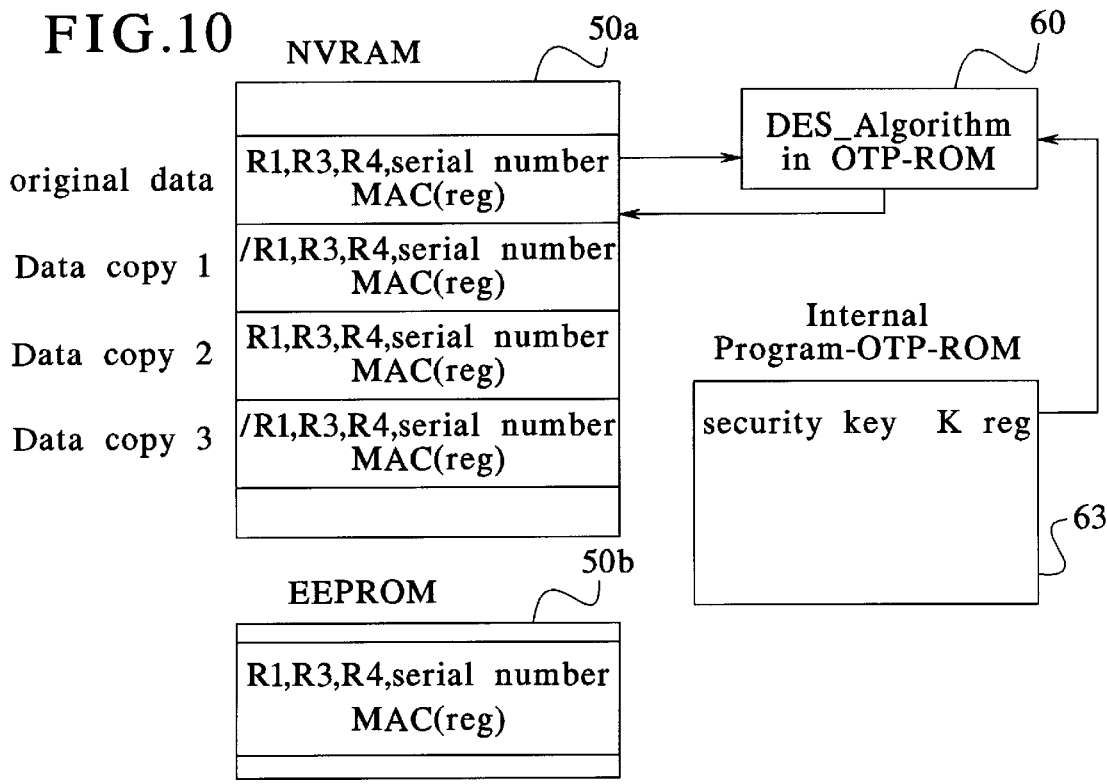
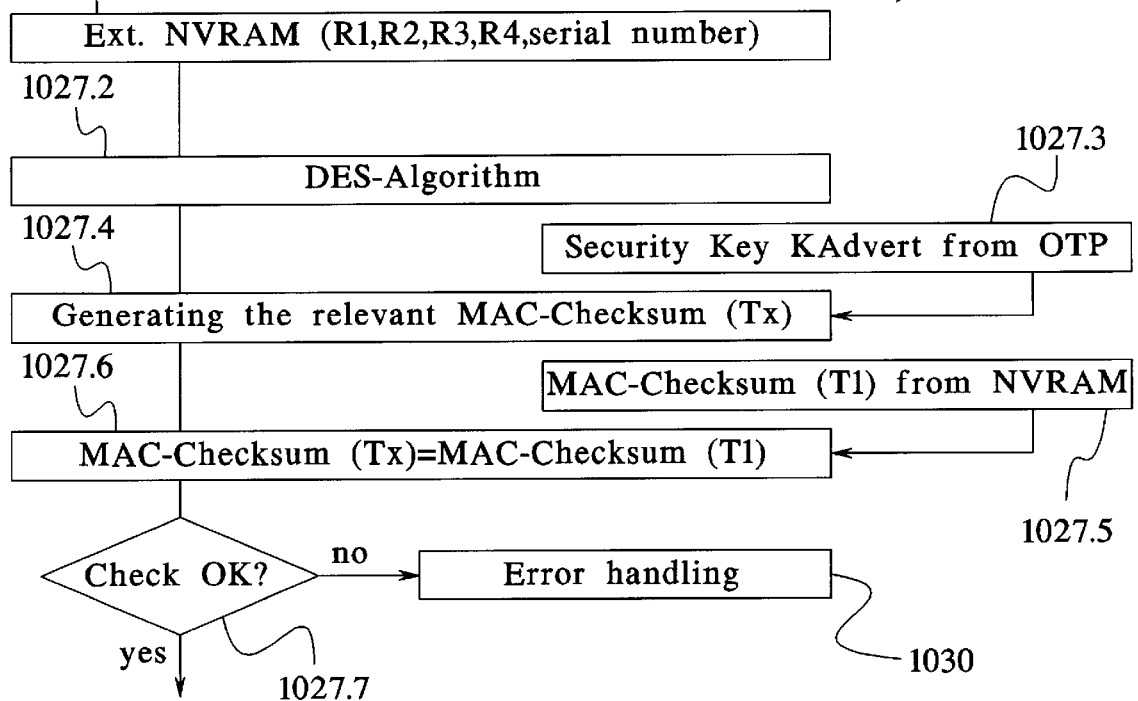

METHOD OF IMPROVING THE SECURITY OF POSTAGE METER MACHINES

RELATED APPLICATION

The present application is a continuation-in-part of U.S. application Ser. No. 08/346,909 filed Nov. 30, 1994 ("Method for Improving the Security of Postage Meter Machines," Windel et al.), filed under the provisions of 37 C.F.R. §1.53, now U.S. Pat. No. 5,671,146.

BACKGROUND OF THE INVENTION

1. Field of the Invention

The present invention is directed to a method for improving the security of postage meter machines capable of communicating with and, to a certain extent, controlled by, a remote central station.

2. Description of the Prior Art

In a form agreed upon with the postal authority in a country of usage, a postage meter machine generally produces an impression flush right parallel to the upper edge of postal items to be franked matter, beginning with the content of a postal value in the postmark, date in the date stamp and mark impressions for advertising slogans and, potentially, the type of mailing in the optional mark. The postal value, the date and the type of mailing thereby form the variable information to be entered in conformity with the piece of mail.

The postal value is usually the delivery fee (franking) pre-paid by the sender that is obtained from a refillable credit register and is employed for stamping the mail. In the current account method, by contrast, a register is merely incremented dependent on the frankings undertaken with the postal value and is read at regular intervals by a postal inspector.

Fundamentally, every franking that has been undertaken must charged to the user billed and every manipulation that leads to a non-charged franking must be prevented.

A known postage meter machine is equipped with at least one input means, one output means, an input/output control module, a memory means that carries a program, data and, in particular, the accounting register, a control means and a printer module. Measures must also be undertaken given a printer module having a mechanical printing arrangement to insure that the printing mechanism cannot be misused for unbilled impressions when it is switched off.

The invention is particularly directed to postage meter machines that deliver a fully electronically produced impression for franking postal matter, including the impression of an advertising slogan. This means that a valid franking that is not accounted for must only be prevented when the machine is in the activated condition.

In a postage meter machine disclosed in U.S. Pat. No. 4,746,234, fixed and variable information are stored in memory means (ROM, RAM), which are then read these out with a microprocessor, when a letter actuates a microswitch on the conveying path preceding the printing position, in order to form a print control signal. The two types of data are subsequently electronically combined to form a printing format and can be printed on an envelope to be franked with a thermotransfer printing means.

A method for controlling the column-by-column printing of a postage character is proposed in a postage meter machine (European Published Application 578 042) that combines fixed and variable data converted separately from one another into graphic pixel image data during the column-by-column printing. It would therefore be difficult to undertake a manipulation at the print control signal without significant and expensive outlay when the printing ensues at high speed.

On the other hand, the memory means comprises at least one non-volatile memory module that contains the currently remaining credit that results therefrom that the postage value to be respectively printed is subtracted from a credit previously loaded into the postage meter machine. The postage meter machine inhibits when the remaining credit is zero.

Known postage meter machines contain three relevant postal registers in at least one memory for consumed total value (incrementing register), remaining credits still available (decrementing register), and a register for a checksum. The checksum is compared to the sum of used total value and available credit. A check for proper accounting is thus already possible.

It is also possible to transmit reloading information to the postage meter machine from a central data station via a remote value prescription in order to reload a credit into the register for the remaining credit (remaining value). Security measures suitable for this type of transaction must be undertaken so that the credit stored in the postage meter machine cannot be replenished in an unauthorized way. The aforementioned solutions for protecting against misuse and attempted forgeries require additional outlay for material and time.

U.S. Pat. No. 4,864,506 discloses an approach wherein communication to the remote central data station be undertaken proceeding from the postage meter machine when the value of the credit in the decrementing register lies below a threshold and a predetermined time has been reached.

The above-recited patent also discloses the establishment of a telephonic connection by the central data station to the postage meter machine after a defined chronological duration with the postage meter machine replying to the central data station only at predetermined times for receiving register data and for checking whether the postage meter machine is still connected to a specific telephone number.

It is also disclosed in the aforementioned patent to interrogate the identity number of the postage meter machine and the values in the decrementing and incrementing register for authorization by the central data station before a reloading of credit into the postage meter machine.

The aforementioned patent also discloses that the communication of the central data station with the postage meter machine need not remain limited to a mere transfer of credit into the postage meter machine. On the contrary, the communication of the central data station with the postage meter machine given a log-off of the postage meter machine is also utilized for transmitting the remaining credit of the postage meter machine into the central data station. The value and the decrementing postal register of the postage meter machine is then zero, this effectively shutting the postage meter machine off.

A security housing for postage meter machines that includes internal sensors is disclosed in German OS 41 29 302. The sensors are switches connected to a battery and are activated when the security housing is opened in order to erase a memory storing the remaining credit (decrementing postal register) by interrupting the energy supply. As is known, however, the condition (content) which a voltage-free memory module assumes upon restoration of the voltage is not predictable. Thus, an unpaid, higher remaining credit may also arise. Additionally, it cannot be precluded that the remaining credit may be at least partially lost under these circumstances. This, however, would be disadvantageous in case of an inspection since any "lost" credit that had been paid for by the user of the postage meter machine must then also be reloaded, but the amount of this remaining credit could then be falsified. Moreover, this document does not disclose means for preventing an unauthorized manipulator for restoring an unpaid remaining credit.

In known postage meter machines, further security measures such as break-off screws and the use of a encapsulated, shielded security housing are employed. Keys and a combination lock are also standard in order to make access to the postage meter machine more difficult.

In addition to these known mechanical techniques, an unauthorized access to a use of the postage meter machine is to be prevented in the machine disclosed in U.S. Pat. No. 4,812,994 by inhibiting the postage meter machine given the absence of a password and/or during a predetermined time interval. The password can be entered via a MODEM, by a chip card or can be manually entered into the postage meter machine via the keyboard. After a positive comparison against a password stored in the postage meter machine, the postage meter machine is enabled. A security module (EPROM) is integrated in the control module of the debiting unit. As a further security measure, an encoding module (separate microprocessor or program for FM-CPU based on DES or RSA code) is provided, which produces a recognition number in the postmark that comprises the postage value, the user number, a transaction number and the like.

It is still possible, however, that the password could be discovered and could be placed into the possession of an unauthorized manipulator together with the postage meter machine.

U.S. Pat. No. 4,812,965 discloses a remote inspection system for postage meter machines that is based on specific messages in the impression of postal matter that must be sent to the central station or transmitted via MODEM in response to a remote interrogation. Sensors within the postage meter machine are intended to detect any falsification action that has been undertaken so that a flag can be set in appertaining memories in the event that operations were performed on the postage meter machine for manipulative purposes. Such an operation could ensue in order to load an unpaid credit into the registers.

Upon detection of a manipulation, the postage meter machine is inhibited during the remote inspection via MODEM by a signal transmitted from the central data station. It is still not fully preventable, however, that a dexterous unauthorized manipulation could in reset the flag and the registers into their original condition after the production of postage impressions that were not accounted for. Such a manipulation could not be detected by the central data station via remote inspection if this canceled manipulation preceded the remote inspection. The reception of the post card from the central data station on which the franking to be undertaken for inspection purposes should ensue also allows the manipulator adequate time, and puts a manipulator on notice, to reset the postage meter machine into the original condition. A higher level of security can thus not be achieved.

The disadvantage of such a system is that one cannot prevent a knowledgeable manipulator who breaks into the postage meter machine from subsequently erasing the flags to eliminate the evidence of tampering. One can thus similarly not prevent the manipulation of the impression itself that is produced by a properly operated machine manipulated. In known machines, there is a possibility of producing impressions having the postage value of zero. Such zero frankings are required for testing purposes and could also be subsequently falsified in that a postage value greater than zero is simulated.

A security impression according to European Patent Application 576 113 provides symbols in a marking field in the postmark that contain a encrypted information. This allows the postal authority which collaborates with the central data station to recognize a manipulation at the postage meter machine at arbitrary points in time based on the respective security impression. Although an ongoing monitoring of such postal matter provided with such a security impression is technologically possible via appropriate security markings in the mark format, this means additional outlay at the post office. Given a monitoring based on spot checks, however, a manipulation is usually is only recognized long after the fact.

Moreover, an additional evaluation can ensue in the central data station of a user of a postage meter machine that has been continued to be operated by the user beyond the inspection date. No conclusions regarding manipulation undertaken for falsification purposes, however, are yet able to be derived from these evaluations.

U.S. Pat. No. 4,251,874 discloses a mechanical printer unit which must be preset for printing and which has a detector means employed for monitoring the presetting. Further, means for identifying errors in data and control signals are provided in the electronic accounting system. When this number of errors reaches a predetermined value, further operation of a postage meter machine is interrupted. The sudden outage of the postage meter machine, however, is disadvantageous for the user of the postage meter machine. In the case of a non-mechanical printer, such internal errors can rarely be anticipated and the postage meter machine is shut off immediately anyway in the event of a serious fault. Moreover, the protection against a manipulation of the postage meter machine does not become significantly greater by shutting the postage meter machine after a predetermined number of errors.

U.S. Pat. No. 4,785,417 discloses a postage meter machine having program sequence monitoring. The correct sequence of a larger program segment is monitored with a specific code allocated to each program part, this specific code being stored in a specific memory cell in the RAM when the program segment is called in. A check is then carried out to determine whether the code stored in the aforementioned memory cell is continuously present in the program part running at the moment. If the run of a program part were interrupted given a manipulation and if a different program part were to sequence, an error can be identified on the basis of such a monitoring query. The comparison, however, can only be implemented in the main sequence. Subsequences, for example security-related calculations that are used by a plurality of main sequences, cannot be checked for execution of the program part on the basis of such a monitoring because the program check ensues independently of the program sequence. If a manipulation occurs wherein allowed program parts or sub-sequences are additionally introduced into main sequences or are omitted therefrom, or wherein a branch is made to sub-sequences, then no error would be identified since the length of the program part is neither identified nor can an identification be made as to which program branch was run how often.

Another type of expected manipulation is the reloading of the postage meter machine register with a credit value that has not been deducted. This necessitates a protected reloading. According to U.S. Pat. No. 4,549,281, an additional security measure can be employed which is the comparison of an internal, fixed combination stored in a non-volatile register with an entered, external combination, whereby the postage meter machine is blocked with inhibit electronics after a plurality of failed attempts, i.e. non-identity of the combinations. According to U.S. Pat. No. 4,835,697, the combination can be changed in order to prevent unauthorized access to the postage meter machine.

U.S. Pat. No. 5,077,660 also discloses a method for changing the configuration of the postage meter machine, whereby the postage meter machine is switched from the operating mode into a configuration mode on the basis of a suitable input via a keyboard, and a new meter type number can be entered which corresponds to the desired plurality of features. The postage meter machine generates a codeword (password) for the communication with the computer of the data central and the entry of the identification data and of the new meter type number in the aforementioned computer, which likewise generates a corresponding codeword (password) for communication to and entry into the postage meter machine wherein the two codes are compared. Given agreement between the two codewords, the postage meter machine is configured and switched into the operating mode. The data central always has exact records of the meter type which has been set for the corresponding postage meter machine. The security, however, is dependent only on the level of difficulty of breaking the encryption encoding of the transmitted codeword.

Over and above this, European Application 388 840 discloses a comparable security technique for setting a postage meter machine in order to purge it of data without having to transport the postage meter machine to the manufacturer. Here, too, the security is solely dependent on the encoding of the transmitted code. It is known to combine the secured reloading of credit into a postage meter machine with an automatic signal transmission from the postage meter machine to the data central, as disclosed in U.S. Pat. No. 3,255,439, whenever a predetermined sum of money that was franked or a predetermined piece number of processed mailings or a predetermined time period was reached. Alternatively, a signal corresponding to the sum of money, piece number or time period can be communicated. The communication thereby ensues with binary signals via converters connected to one another via a trunk. The machine receives reloading data corresponding to the credit balance that are secured in exactly the same way and is inhibited when no credit is resupplied.

U.S. Pat. No. 4,811,234 discloses that transactions be implemented encrypted and to interrogate registers of the postage meter machine and to communicate the register data to the data central in order to display a chronological reference to the diminution of the amount authorized for availability, the amount being stored in the register. The postage meter machine identifies itself at the data central by its encrypted register content when a pre-settable threshold is reached. The data central modifies the requested franking amount up to which franking is allowed to be carried out on the basis of corresponding authorization signals. The encryption is thus the sole protection against a manipulation of the register readings. The data central can thus not identify the occurrence of a manipulation if a manipulator always properly loads the same amount at the same chronological intervals, but franks a far higher amount in the meantime with the manipulated postage meter machine.

European Application 516 403 discloses that the errors of the postage meter machine logged in the past and stored in a memory be regularly transmitted to a remote error analysis computer for evaluation. Such a remote inspection allows an early warning of the presence of an error and makes it possible to have recourse to further measures (service). This approach, however, does not yet offer an adequate criterion for detecting a manipulation.

According to British Specification 22 33 937 and U.S. Pat. No. 5,181,245, the postage meter machine periodically communicates with the data central. A blocking means allows the postage meter machine to be blocked after the expiration of a predetermined time or after a predetermined number of operation cycles and supplies an alarm to the user. For enabling, an encrypted codeword must be entered from the outside, which is compared to an internally generated, encrypted codeword. In order to prevent incorrect accounting data from being supplied to the data central, the accounting data are also incorporated into the encryption of the aforementioned code. A disadvantage is that the alarm ensues simultaneously with the blocking of the postage meter machine without giving the user a possibility of appropriately modifying his behavior in time.

U.S. Pat. No. 5,243,654 discloses a postage meter machine wherein the ongoing temporal data supplied by a clock/date module are compared to stored data about standstill times. When the standstill time is reached by the running time, the postage meter machine is deactivated, i.e. printing is prevented. When a central data station which reads the accounting data from the incrementing register is contacted, an encoded combination value is communicated to the postage meter machine and a new deadline is set, as a result of which the postage meter machine is again rendered operational. The sum total of use which contains the aggregate postage used and is read by the central data station is thereby likewise a component of the combination value transmitted in encoded form. After decoding the combination value, the aggregate amount of use is separated and compared to the aggregate amount of use stored in the postage meter machine. When the comparison is positive, the inhibit of the postage meter machine is automatically canceled. This solution achieves the desirable result of necessitating that the postage meter machine periodically reports to the central data station in order to communicate data. Instances of use are conceivable, however, wherein the volume of mail to be franked fluctuates (seasonal operation). In these cases, the postage meter machine would be inhibited unnecessarily frequently in a disadvantageous way.

SUMMARY OF THE INVENTION

It is an object of the present invention to provide a postage meter machine which overcomes the aforementioned disadvantages of known machines and which achieves a significant increase in security without the necessity of conducting unscheduled ("surprise") on-site inspections.

It is a further object of the present invention to provide a method for operating such a machine wherein improved security is achieved without the need for a special mechanical encapsulation of the interior components of the machine, and without the necessity of using a sensor for recognizing when an unauthorized opening of the housing has occurred.

It is a further object of the present invention to provide such a method which permits the occurrence of a manipulation, which was undertaken with the intent of falsification, to be recognized and which provides enhanced security for the data stored in the components.

It a further object of the present invention to provide a method for operating such a postage meter machine which allows the postage meter machine to remain secure but to have a housing which permits relatively easy access to individual electronic modules of the machine for a service technician.

Another object of the present invention is to provide such a method which permits the machine to operate using a processor without an internal NV-RAM.

Lastly, it is an object of the present invention to provide a method for operating a postage meter machine wherein the security of the ciphers in the postage meter machine, that are required for communicating with a central data station, to be improved during a data communication event.

The above objects are achieved in accordance with the principles of the present invention in a method for improving the security of data and the program code in an electronic postage meter machine, the postage meter machine being of the type having a microprocessor in a control unit for implementing steps for a start and initialization routine and a subsequent system routine, with the possibility of entering into a communication code with a remote data central station, as well as for implementing further input steps in order to enter into a franking mode, from which a branch can be made back to the system routine after the implementation of an accounting and printing routine. In accordance with the principles of the present invention, the method includes the steps of conducting a security check within the start and initialization routine, the security check running before a secure printing data call routine and the subsequent system routine, for determining the validity of a program code and/or of data in a predetermined memory location of an associated MAC (message authentification code) which is stored in the same memory. The check for a valid program code and/or for the validity of the data is conducted using a selected checksum method with an OTP (one time programmable) processor which internally receives the corresponding program portions. In accordance with the method, the postage meter machine is then transferred into the aforementioned system routine given verification of the validity of the data, or the postage meter machine is transferred into a first mode if the data are invalid, or if a predetermined manipulation criterion is met. Under such circumstances, appropriate steps are then taken to prevent franking, or to block the postage meter machine and/or steps may be taken for preventing a further program execution or a program branch from the OTP processor within the aforementioned system routine.

The invention is based on a processor that can be programmed only once.

Increased security can be achieved, for example, with a mask-programmed microprocessor that has externally accessible ports and an internal bus structure, an internal ROM, an internal RAM for security-associated executions. Security-associated data and routines are burned into the internal ROM during manufacture.

In a preferred version the postage meter machine has a microprocessor which contains an internal ROM that does not allow a read-out of the program codes contained therein. This can be a commercially obtainable OTP (one time programmable) processor that is placed into such a condition after the programming event by setting/burning a read-out barrier.

The postage meter machine can also be equipped with an OTP type that allows a read-out of security-associated data and programs in encrypted form (encryption table). This has the advantage that it is possible to check whether the data were properly stored.

The invention has the advantage that program code and constant, security-associated data cannot be modified, cannot be skipped over and cannot be learned by inspection or by electronic means. The program execution of program parts that are implemented in the internal OTP-ROM can thus not be manipulated. As long as no program branch occurs, there is reliable protection against fraudulent manipulation. Inventively, the program parts that are implemented in the internal OTP-ROM also enable protection of externally stored program parts that, for example, are present stored in an EPROM. A number of ciphers and an encryption algorithm are also inventively stored in the OTP-ROM, these being employed in the program execution of security-associated transactions and in the external storing of security-associated data.

The EPROM accepts the majority part of the program code and makes an external program code available to the microprocessor via the microprocessor bus. Since, however, the program variables are additionally stored in the internal OTP-RAM, a security-associated encapsulation of the program execution is achieved. Program executions having different security levels can thus be designationally realized with an OTP processor. A faulty or manipulated postage meter machine remains completely in the OTP-ROM with its program execution and cannot be forced into different operating modes.

The inventive solution also proceeds on the basis that the financial information stored in the postage meter machine must be protected against unauthorized access. The falsification of data stored in the postage meter machine is rendered difficult to such an extent that the outlay and effort are no longer worth it for a manipulator.

Commercially obtainable OTP processors (one time programmable) can contain all security-associated program parts in the inside of the processor housing and can also contain the code for forming the message authentification code (MAC). The latter is an encrypted checksum that is attached to an information packet. For example, data encryption standard (DES) is suitable as a crypto-algorithm. MAC information can thus be appended to the security-associated register data and the difficulty of manipulation at the postal registers can be maximally increased.

These security-associated program parts also have program parts for flow monitoring that monitor the various executed program parts. Malfunctions of the microprocessor or manipulations undertaken with the intent of falsification can thus be discovered. Specific calculating operations allow a check to determine which program parts are employed and how often.

Another security measure, which can be executed in addition to the error handling (kill mode) of the start-security check is to monitor the program running time of selected, security-associated programs or program parts in a time supervision mode (kill mode 1). Given a deviation of the running time of programs or program parts from a predetermined running time as occur given manipulation or monitoring of the program execution with an emulator, the machine is inhibited. One such program part relates to the communication mode. A secret cipher for the encrypt communication is stored in encrypted form outside the OTP. The OTP can recover the actual cipher therefrom by decoding, this being required for transactions between the postage meter machine and the data central.

The postage meter machine can switch from the system routine into the second mode with a decision criterion in order to provide the user of the postage meter machine with an alarm and with a request to communicate with the data central station. At the same time, the behavior of the postage machine user is monitored by the data central station on the basis of data previously communicated during a communication event.

In the inventive postage meter machine a specific sleeping mode counter is set to a specific number of items in each communication event with the data central and is initiated to continue counting at every franking, i.e. during the course of a debiting and printing routine, until a specific number is reached. The specific number of items is calculated both in the postage meter machine and in the data central station and is communicated to the postage meter machine via a communication connection.

In order to improve the securing of postage meter machines with only one microprocessor and a suitable program of a postage meter machine, a user-associated information word or packet about the use of credit that is simultaneously identically present in the data central station and in the machine forms a first calculating base in order to check data relating to the credit use and credit reloading data stored in the data central station for their plausibility. Another inventive calculating base uses further data, particularly in conjunction with the number of items since the last communication, and allows an unscheduled inspection of a postage meter machine which is considered suspicious in the data central station to be undertaken on site.

The postage meter machine that receives a regular reloading of credit and is thereby inspected can thereby be classified as non-suspect. The postage meter machine that continues to be operated without inspection beyond a predetermined inspection date, however, need not necessarily be manipulated. For example, the volume of mail to be processed by the postage meter machine may have diminished to an above-average extent. When adequate remaining credit is available in the postage meter machine, of course, franking can continued to be carried out. Only an unscheduled on site inspection can unambiguously determine whether a manipulation has occurred in this case.

For inspecting suspicious postage meter machines, the data central station informs the postal authority or the institution authorized to carry out the inspection, of the serial number of the suspect postage meter machine. The volume of mailings (letters) of specific senders can be monitored with this information, such as by counting the number of mailings over a time interval of, for example, ninety days.

An operation may possibly have to be performed on the postage meter machine given an on-site inspection or repair. For preparing for the intervention, the registers of the postage meter machine are interrogated or printed out in order to identify the type of required intervention. After an authorized operation performed on the postage meter machine has ensued, the original operating condition is restored with the specific data being re-entered in a suitable way.

When, however, a manipulator undertakes an unauthorized intervention, the postage meter machine is effectively placed out of operation after the power-up by switching the postage meter machine into the first mode (error handling).

Another security measure that can be implemented in the second mode in addition to or instead of a sleeping mode version is the error overflow mode. This lengthens the reaction time span of the postage meter machine when a predetermined number of errors is exceeded and reports this condition to the operator of the postage meter machine via the display. If the cause of the excess number of errors is not eliminated, for example by means of an inspection by a service contractor or by resetting during a communication with the data central station, the reaction time span can be lengthened further in order to make potential manipulations more difficult.

For securing data and program code of an electronic postage meter machine that is capable of communication with a remote data central station and which contains an OTP processor in a control unit of the postage meter machine in accordance with the inventive method an externally stored, predetermined MAC value is transmitted into the internal OPT-RAM and a checksum is formed in the OTP processor regarding the content of that external memory that is allocated to the MAC. A comparison of the result with the predetermined value of the MAC volatily stored in the internal OTP-RAM is made before and/or after the expiration of the franking mode or operating mode, and thus before the initialization as well (i.e., when the postage meter machine is operated) or during times wherein printing is not carried out (i.e., when the postage meter machine is being operated in a stand-by mode). In case of error, a reporting and subsequent blocking of the postage meter machine then ensue.

DESCRIPTION OF THE DRAWINGS

FIG. 10 is a flowchart for securing selected register data in accordance with the inventive method.

FIG. 11 is a flowchart for checking selected register data in accordance with the inventive method.

DESCRIPTION OF THE PREFERRED EMBODIMENTS

Figure 1:
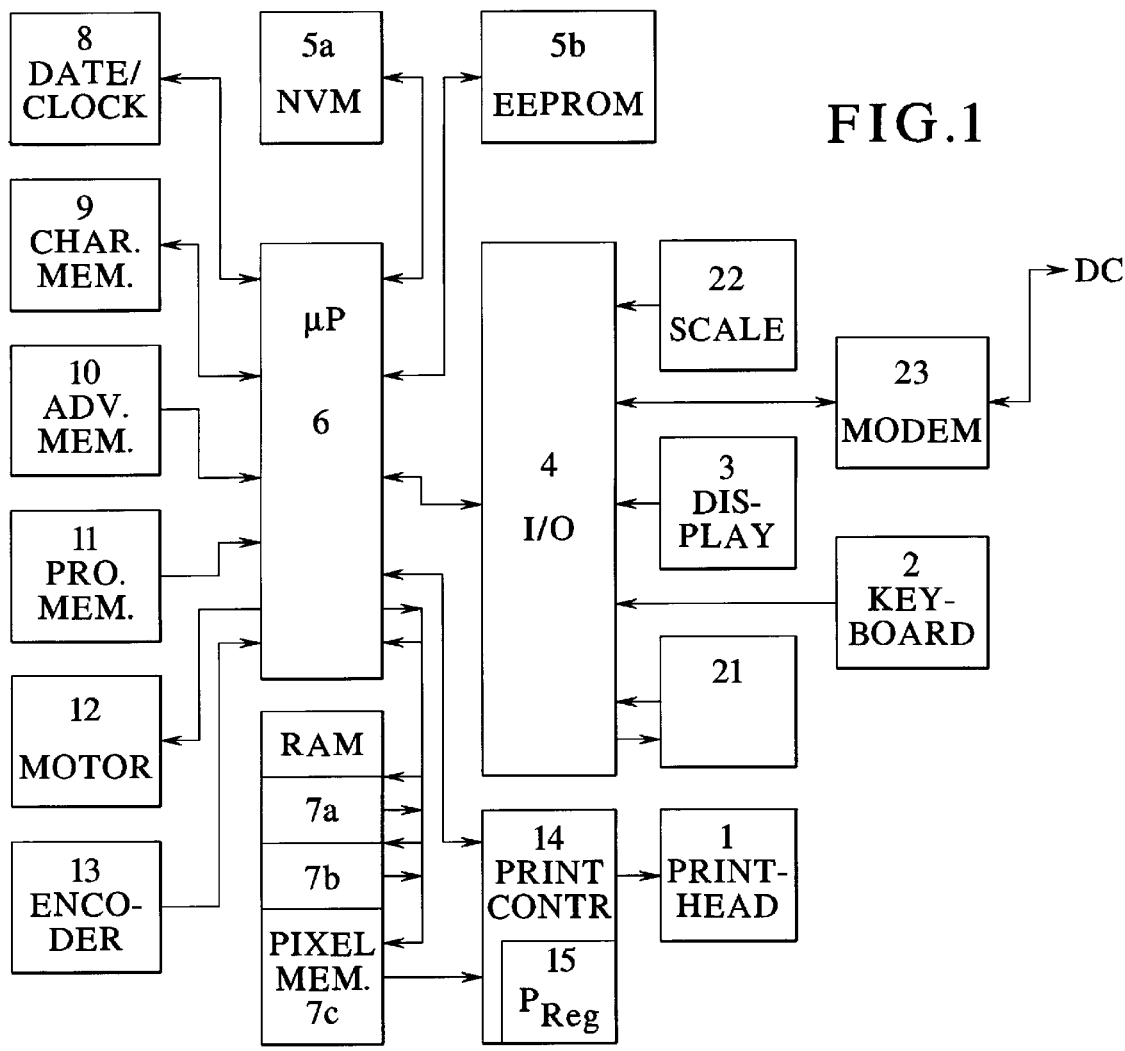
FIG. 1 is a block circuit diagram of a postage meter machine having increased security operating in accordance with the inventive method.

FIG. 1 shows a block circuit diagram of the inventive postage meter machine having a printer module 1 for a fully electronically produced franking format, comprising at least one input unit 2 having a number of actuation elements, a display unit 3, a modem 23 that produces communication with a data central station, further input unit 21 or a scale 22 coupled to a control unit 6 via an input/output control module 4, and non-volatile memories 5a, 5b and 9, 10 and 11 for data or programs that include the variable or, the constant parts of the franking format.

The character memory 9 supplies the necessary printing data for the variable parts of the franking format to a volatile main memory 7. The control unit 6 includes a microprocessor UP that is in communication with the input/output control module 4, the character memory 9, the volatile main memory 7 and the non-volatile main memories 5a, 5b, (which form a cost center memory), and with a program memory 11. The control unit 6 also communicates with the motor 12 of a conveyor or feeder, potentially with strip triggering, with an encoder (coding disk) 13, as well as with a clock/date module 8. The individual memories can be realized in a number of physically separated modules or combined in a few modules (not shown). The memory module that includes the non-volatile main memory 5b can, for example, be an EEPROM that is protected against removal by at least one additional measure, for example gluing on the printed circuit board, sealing or being cast with epoxy resin.

The electronic postage meter machine shown in FIG. 1 has inventively enhanced security. The invention is based on a postage meter machine having a microprocessor that contains an internal OTP-ROM that does not allow the program code contained therein to be read out. Moreover, security-associated data are stored in the internal OTP-ROM. In order to prevent the read-out by means of an external operation, corresponding security bits can be set in the microprocessor during the manufacture of the postage meter machine. This can be a commercially obtainable OTP processor that is placed into such a condition after the programming event by setting/burning a read-out barrier; or this can be a microprocessor having mask-programmable ROM that no longer allows a read-out of the program code after the manufacturing process or only allows a read-out of the program code and the data in encrypted form.

Figure 2:
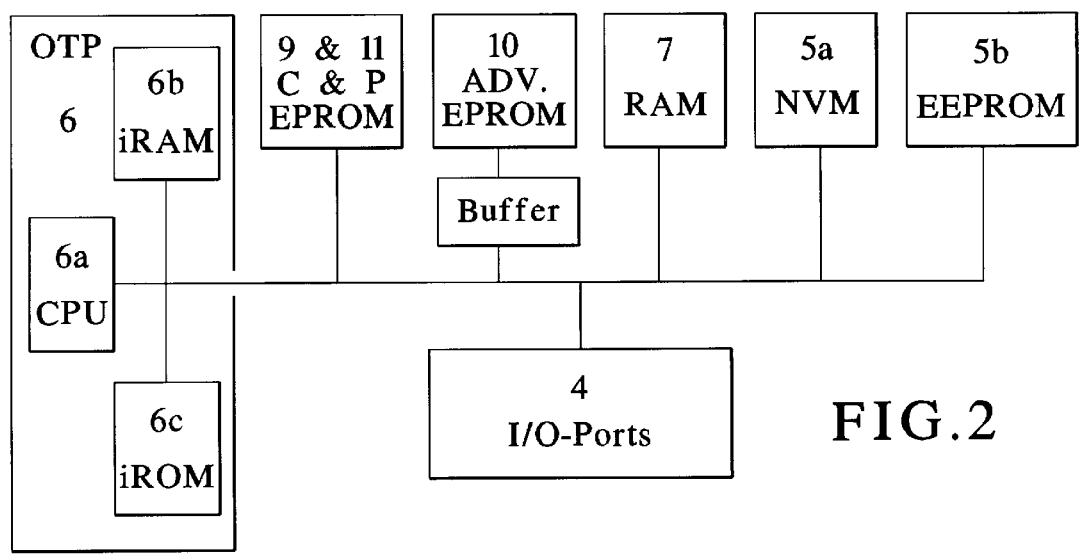
FIG. 2 is a block circuit diagram of a postage meter machine having increased security operating in accordance with the inventive method with an OTP in the control unit of the postage meter machine.

FIG. 2 shows a detail of the block circuit diagram of the electronic postage meter machine for a version having OTP in the control unit 6. Given this fundamental arrangement in FIG. 2, sensors and actuators such as, for example, the encoder 13 and motor 12 shown in FIG. 1 can optionally be directly connected to the OTP or can be connected thereto via I/O ports.

A preferred version of a microprocessor is an 8051 processor with 16 kbyte on-chip EPROM (Philips 87 C51 FB). Such an OTP type (one time programmable) cannot be erased by ultraviolet light because it does not have a window suitable for ultraviolet light passage. Programming thereof can therefore be done only once. The internal OTP-RAM has a memory area of 256 bytes.

The invention also operates on the basis that the entire program code required for the operation of a postage meter machine does not fit into the microprocessor-internal ROM, i.e. another EPROM is needed that accepts the majority of the program code and that makes the program code available to the microprocessor via the microprocessor bus. An arrangement is employed for this purpose that divides the program memory into memory segments, referred to as memory banks, that allow the program memory area to be arbitrarily enlarged via the address area of the MP by using MP port lines.

Figure 3:
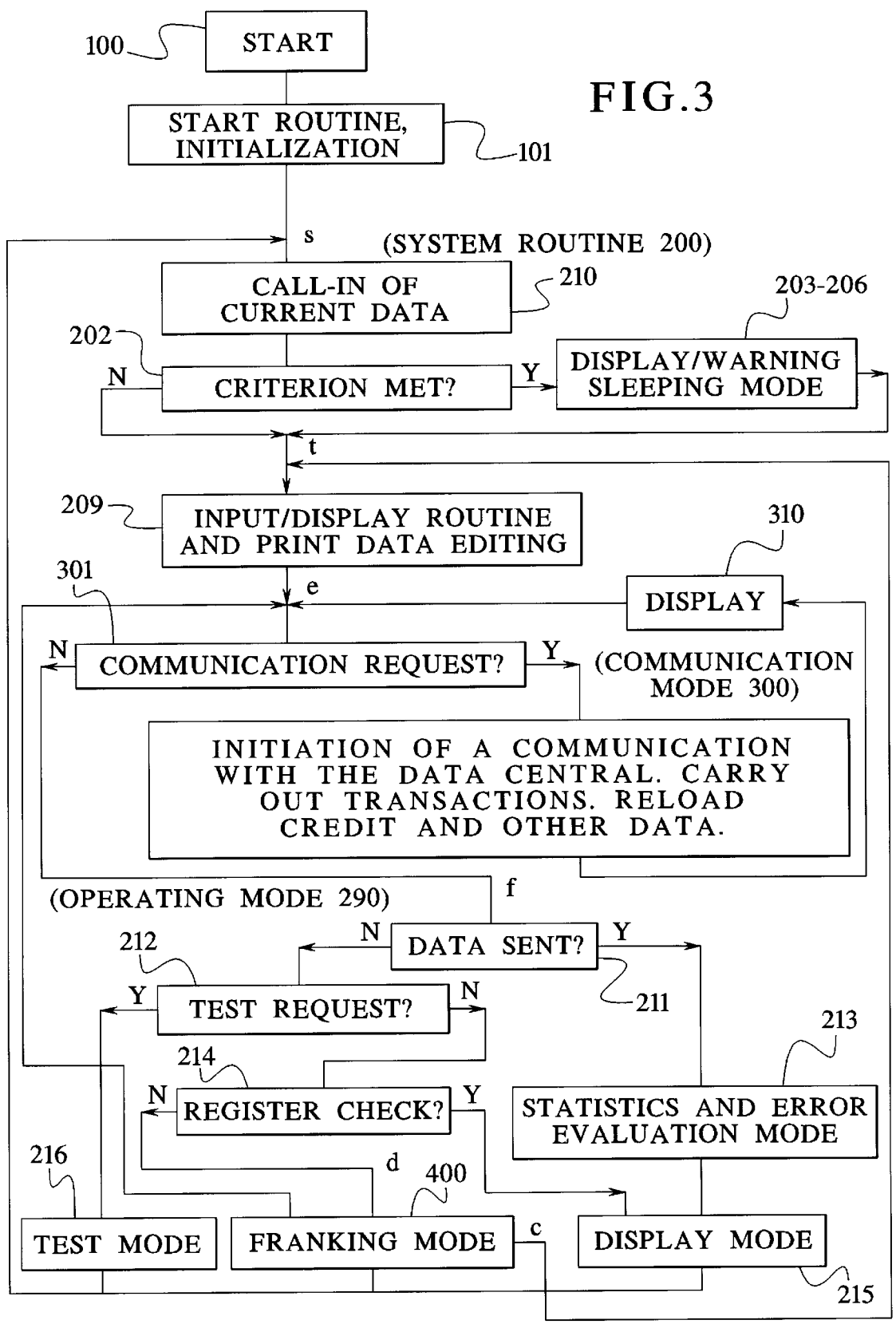
FIG. 3 is an overall flowchart for a postage meter machine operating according to the inventive method.
Figure 4:
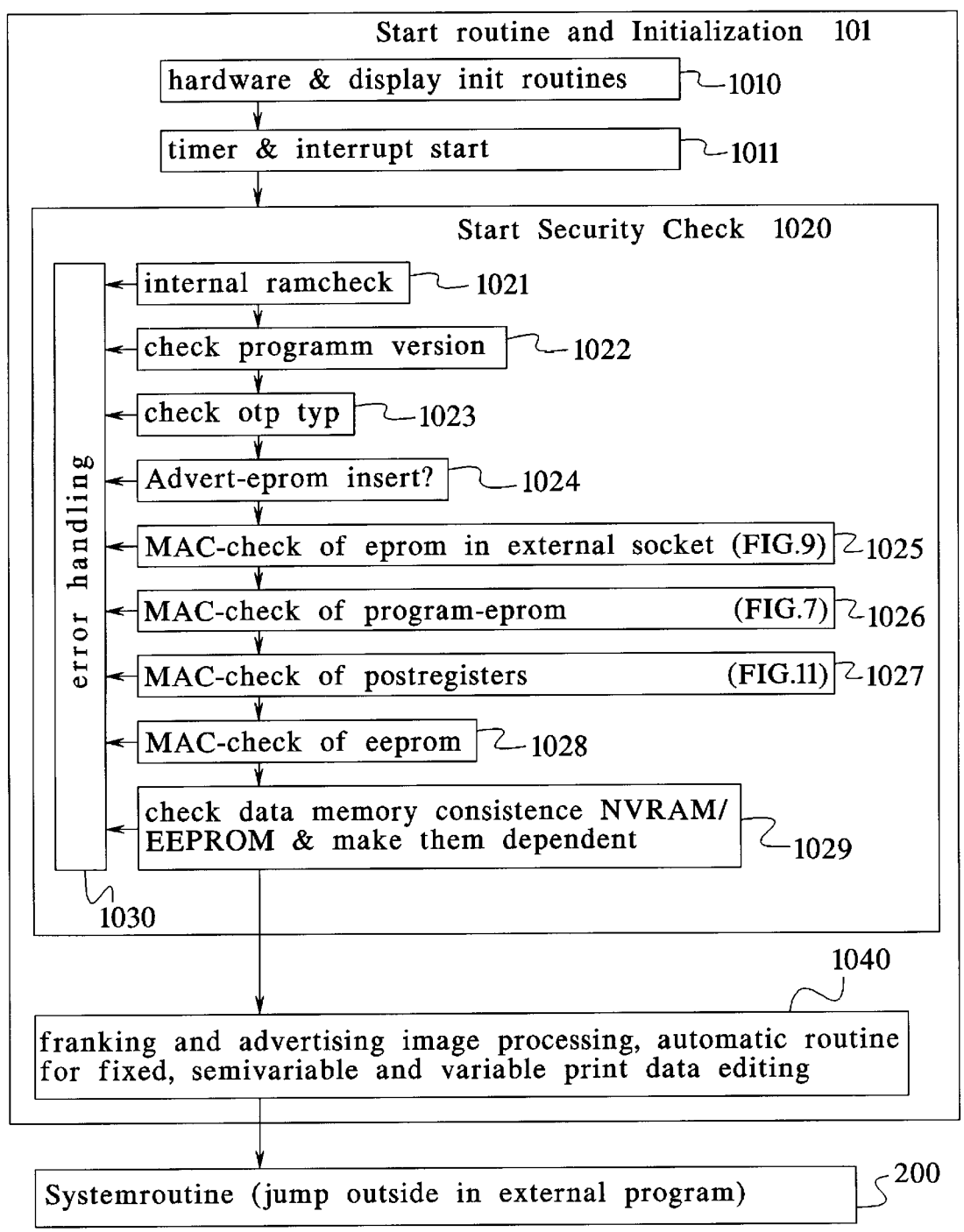
FIG. 4 is a flowchart for the start and initialization routine of FIG. 3.

FIG. 3 shows an overall flowchart of a postage meter machine having inventively enhanced security, whereas FIG. 4 shows an inventive detail therefrom in greater detail, namely a flowchart for the start and initialization routine.

As shown in FIGS. 3 and 4 a power-up of the postage meter machine ensues in the step start 100 and a function check with subsequent initialization is undertaken subsequently within a start routine 101 and a branch to a system routine 200 is only undertaken thereafter.

Figure 7:
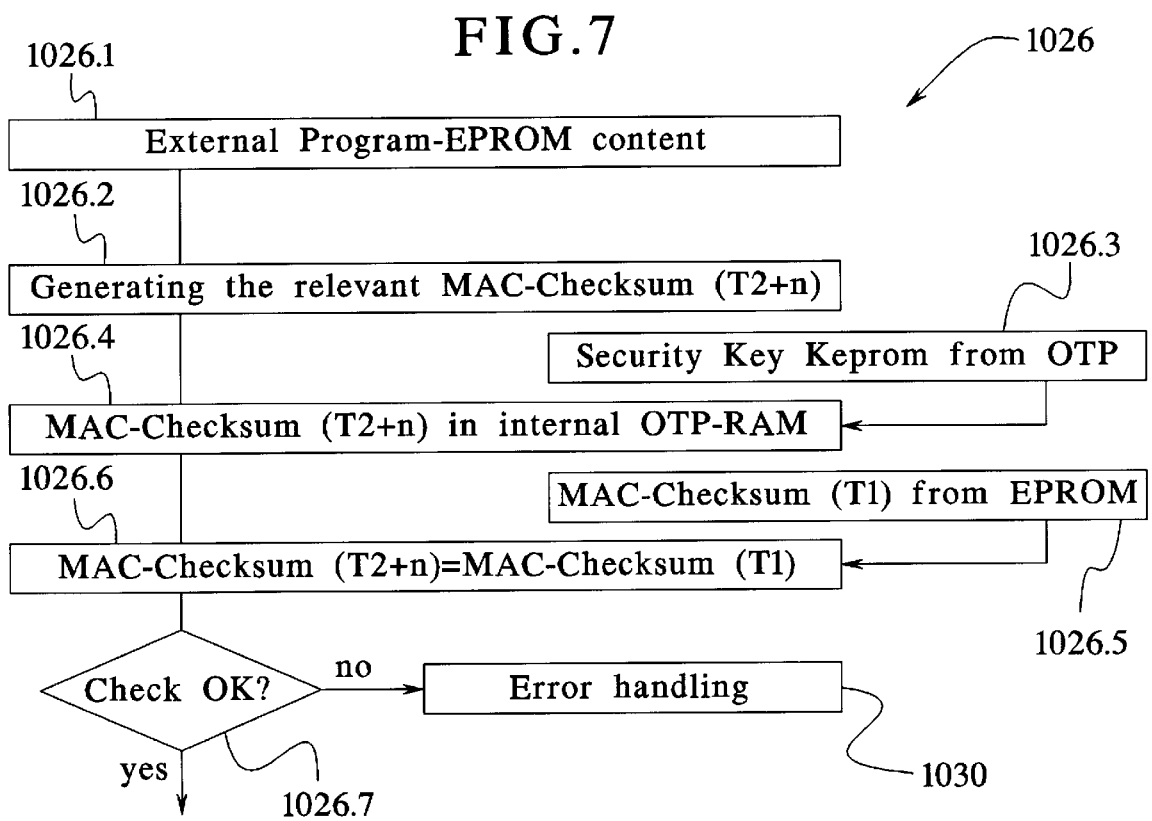
FIG. 7 is a flowchart for checking an external program-EPROM in accordance with the inventive method.
Figure 9:
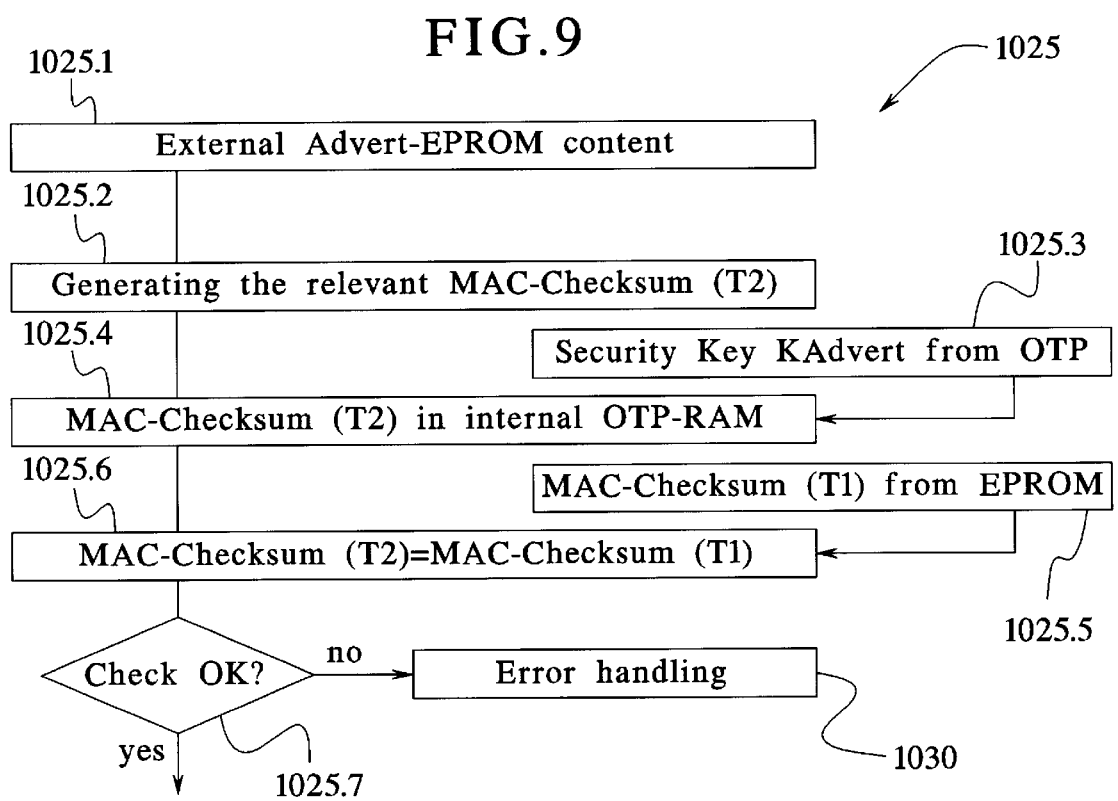
FIG. 9 is a flowchart for checking an external imprint-EPROM in accordance with the inventive method.

A program code in the non-readable, internal OTP-ROM then allows a number of advantageous start security check routines but at least those as named in FIG. 4 and set forth in greater detail in conjunction with FIGS. 7, 9 and 11.

These routines relate to the method for securing data and program code of an electronic postage meter machine and serve the purpose of improving the security of this electronic postage meter machine within the framework of a start security check in conjunction with the initialization thereof.

After the start, a start routine ensues in step 101 and an initialization of the postage meter machine ensues. Such routines initialize the hardware and display in a standard way and start a timer and, or, respectively, interrupt. The step 101 inventively includes a start security check 1020.

A start security check routine is undertaken, which checks the most important, externally maintained postage meter machine data and external program code completely encapsulated in the internal ROM and RAM area of the OTP with its program code. This security check routine can thereby recognize manipulations—without an external possibility of influencing with manipulative intent thereby existing—that had been implemented during the deactivated condition of the postage meter machine and can then effectively inhibit further operation of the postage meter machine if the check routines are not run error-free. In this case, the program execution remains in an endless program loop in the OTP-ROM (error handing 1030). The external storage media are used by the MP (read EPROM, write RAM) only after the checks have been run error-free and the system routine 200 is reached.

FIG. 4 shows the schematic program flowchart of all functions that are implemented during the start security check of the postage meter machine in the OTP-ROM. Inventively, the start security check of the postage meter machine includes a number of routines in addition to the routine 1026 for the securing of the external program memory.

For example, the routine 1021 not set forth in greater detail here denotes a check of the internal OTP-RAM with respect to its operating capability. The program version numbers are compared in the routines 1022 and 1023, i.e. a determination is made whether the burned OTP together with the EPROM forms a set of complete program code or whether a different EPROM belongs to the OTP. In routine 1024, a check is made on the basis of the data predetermined by the imprint-EPROM to see whether a valid imprint-EPROM or, respectively, an imprint-EPROM belonging to the aforementioned set is plugged in the socket. It should be noted that an advantage is that the imprint-EPROM can be plugged into the socket or replaced not only by the service technician but can also be unproblematically plugged or, respectively, replaced by any other authorized person. Specific driver circuits (buffers) that are connected (FIG. 2) between the bus and the EPROM socket prevent external read-out of internal postage meter machine data. Data can be entered into the postage meter machine at any time, however, via the socket.

The routine 1026 relates to the securing of the external program memory and the routine 1025 relates to the securing of the externally accessible EPROMs and the data stored therein against manipulations on the basis of a security check. A first monitoring of security-associated or postal register data in the external NVRAM and EEPROM is undertaken in the routines 1027 and 1028. The routine 1029 identifies invalid data copies or data copies capable of being repaired and eliminates the error as warranted.

As set forth in greater detail in European Application 615 211, at least one register check of the data structure of the postal register is implemented in step 1029 in order to log the errors. This is a method for memory correction of security-associated data in a postage meter machine, wherein redundantly stored data are compared to one another in order to again load a memory area having faulty data with error-free data. This, however, is no longer possible given a sixth error type because all redundantly stored data now have different errors that can no longer be automatically corrected. Only a service technician could reconstruct the data in a predetermined way, which must occur after every authorized opening before the postage meter machine is placed back into operation. Measures are therefore also undertaken in step 1030 in order to inhibit the postage meter machine given register data structure errors.

The routine 1026 to be set forth in greater detail below for securing the external program memory is based on the storing of a MAC in the memory module to be respectively secured. In addition to the required preservation of the data reliability, this especially has the advantage of permitting replacement of a malfunctioning program-EPROM without having to simultaneously replace the OTP as well.

Figure 6:
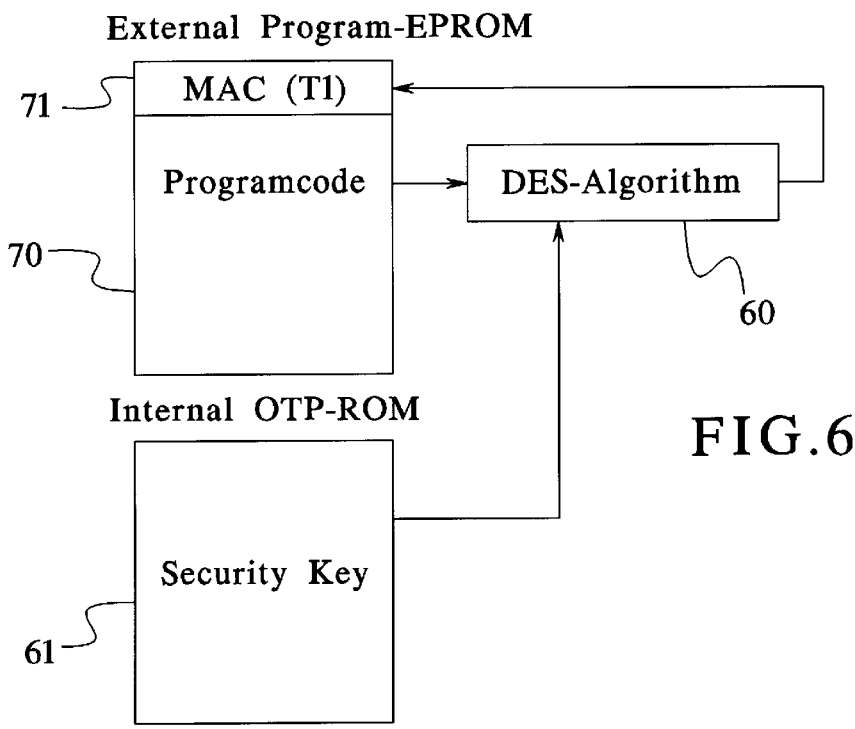
FIG. 6 illustrates the formation of a MAC checksum by encryption for an external program-EPROM.

For securing the external program memory, an application of the MAC method ensues in step 1026 for checking the integrity of the program code of external, bus-coupled EPROMs before the bus access of the processor and during the ongoing program execution. Advantageously, secure cryptographic functions can be realized with a secret code that is hidden unreadably in the internal program memory, the security of these cryptographic functions being based on the use of this secret code. When data relating to a checksum (for example, CRC) about the memory content (block 70) of the program memory are encrypted with a cryptographic function (block 60) such as, for example, the data encryption standard (DES), using this secret code (block 61), a cryptographic checksum is obtained, what is referred to as the message authentication code (MAC) that forms a checksum (for example, CRC) about the memory content (block 70). Inventively, this MAC is formed once, at a time $T_1$ at which manipulations are precluded, and is stored in a non-volatile memory area (block 71) of the external program memory of the microprocessor system. This point in time $T_1$ is achieved only at the manufacturer of the postage meter machine, whereby this MAC (T1) is formed, for example during the program code data production in the personal computer, with the cryptographic checksum method (for example, DES algorithm) and is embedded in a defined memory area in the EPROM source data. The aforementioned data are burned into the EPROM during programming. FIG. 6 shows such a formation of a MAC checksum with the DES method via external program EPROMs, whereby the MAC is embedded in the memory area to be filled.

A start routine and initialization of an electronic postage meter machine was proposed in European Application 660 269, FIG. 2a (step 101), but without setting forth these details. Further, a routine for the initialization was proposed, wherein a security-relevant program code is deposited in the OTP, and wherein the formation of a checksum about the content of the external program memory and a comparison ensue in the OTP. The MAC, however, was stored in a specific OTP with internal NVRAM. Moreover, measures were not disclosed for preventing a manipulator from assuming control of the microprocessor with his or her own program code in the external EPROM as soon as the microprocessor leaves the internal ROM region by using a jump or call command, and thus skipping over security check routines that should actually be subsequently implemented in the OTP-ROM. Further, measures were not disclosed to the effect that, as soon as the microprocessor writes the external RAM serving as data memory for its program code to be implemented, this can be modified by a manipulator, which can modify or disturb the program execution.

FIG. 7 shows an execution for checking an external program-EPROM for manipulations with MAC checksum methods. During the running time of the postage meter machine, the microprocessor system can form the MAC (in step 1026.2) at time $T_2$ and later $(T_{2+n})$ using the same secret code (step 1026.3) according to the same cryptographic checksum method (step 1026.2) regarding the memory area (1026.1) to be checked, and compares this MAC $(T_{2+n})$ to the MAC $(T_1)$ taken from the EPROM (in step 1026.5) (see step 1026.6). As a result of this comparison, the data integrity can be checked during the running time of the postage meter machine and manipulations of the memory contents can be recognized (step 1026.7). Given a negative comparison, appropriate measures can then be undertaken that prevent further operation of the postage meter machine (step 1030) or to make a manipulation more difficult or to indicate such a manipulation with suitable measures.

The continuous MAC formation ensues, following the start security check, in every one of the operating program loop, so that a relevant MAC is respectively formed over a larger number of program memory cells with the cryptographic checksum method and can be compared to the stored MAC formed at time T1.

What is thus achieved is that the time up to a MAC checksum comparison about the entire memory contents (128,000 bytes) is relatively short. The interval between the checksum comparisons can be linked to a chronological monitoring, so that a stoppage of the program is recognized and leads to a negative MAC comparison.

Figure 8:
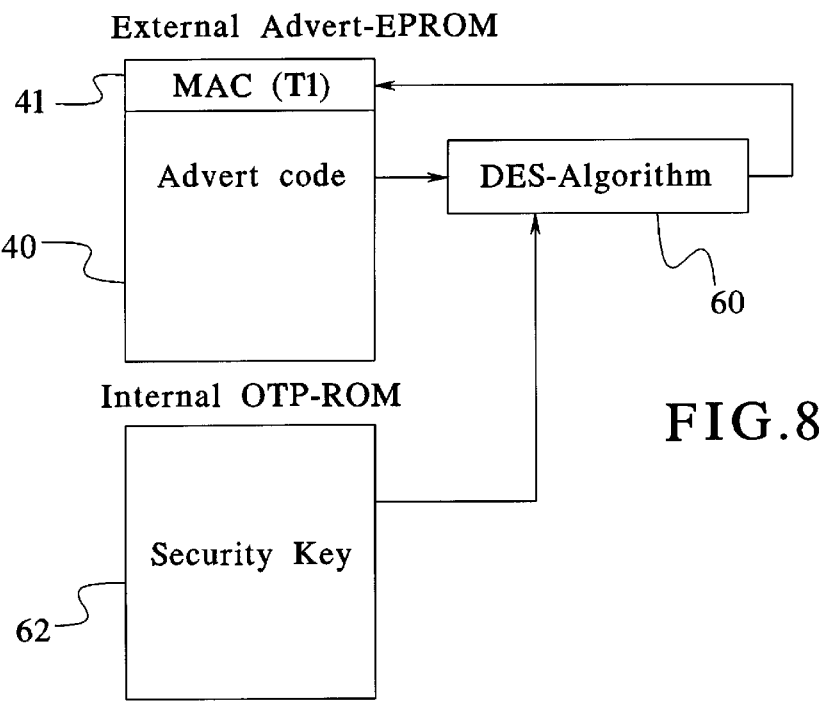
FIG. 8 illustrates the formation of a MAC checksum by encryption for an external imprint-EPROM in accordance with the inventive method.

FIG. 8 shows the formation of a MAC checksum with the DES method by means of EPROMs in the socket of the open postal flap. This is another advantageous application of the MAC method for checking the integrity of data and of the program code of EPROMs that are inserted into the externally accessible socket given a postage meter machine with an opened postal flap.

European Application 660 269 also proceeds on the basis of a postage meter machine that has a closeable and sealable flap that allows access to the hardware (EPROM socket) lying therebehind only to a limited group of persons who are known to be reliable. It is assumed that these persons will not undertake any manipulation of the postage meter machine. A security-maintaining solution has now been found, in accordance with the invention, that can be employed in a postage meter machine that has a partially opened postal flap. This has the advantage that the user has access to the imprint-EPROM socket and can replace the imprint-EPROM socket on his or her own. As may be seen from FIG. 2, this socket is connected to the microprocessor bus, i.e. a manipulation could ensue by means of a manipulator using a manipulated program-EPROM that, like a reset-EPROM, assumes the control of the microprocessor system, and thus intentionally modifies sums of money, entries or security entries in the postage meter machine, or by using a manipulated imprint-EPROM that contains modified printing data of the value stamp (location of the sender, postal code of the sender) and which results in a manipulation of the value stamp imprint.

FIG. 8 shows the securing of a further external EPROM. Again, the aforementioned principle of the MAC securing regarding the memory areas can be applied, since reliable cryptographic functions whose reliability is based on the use of a secret code can be realized with a secret code that is unreadably hidden in the internal program memory (OTP-ROM). When a checksum of these data areas (block 40) is encrypted with a cryptographic function (block 60), for example, DES using this secret code (block 40), a cryptographic checksum relating to the memory contents arises. This MAC must be formed once at time $T_1$ at which manipulations are precluded and is stored (block 41) in the EPROM that is inserted into the imprint socket (imprint EEPROM, reset-EPROM). This MAC ($T_1$) is formed, for example, during the program code data production of the reset-EPROM in a personal computer and in the imprint data production with the cryptographic checksum method (for example, DES algorithm) and is embedded in a defined memory area in the EPROM source data.

FIG. 9 shows the checking of an EPROM in the imprint socket with MAC checksum methods for manipulation. During the running time of the postage meter machine, the microprocessor system can form the MAC about the memory area (step 1025.1) to be checked according to the same cryptographic checksum method (step 1025.2) at time $T_2$ of the start security check using (step 1025.3) the same secret code and compares this MAC ($T_2$) to the MAC ($T_1$) taken (step 1025.5) from the EPROM (step 1025.6). As a result of this comparison (step 1025.6), the data integrity of the value stamp data can be checked and manipulations of the program code can be recognized (step 1025.7). Given a negative comparison, appropriate measures can then be undertaken that prevent further operation of the postage meter machine (error handling 1030).

FIG. 11 relates to the checking of selected postal data values in an electronic postage meter machine that are protected with a MAC. Such a check is implemented, for example, in step 1020 during the start and initialization routine, and the communication mode 300 and in the franking mode 400.

The start security check in the start and initialization routine is thus implemented with a selected checksum method within a OTP (one time programmable) processor that keeps the corresponding program parts internally stored and also stores the code for forming a MAC (message authentification code), for which reason the manipulator cannot reduplicate the type of checksum method. Further security-associated cryptodata and sequences are stored exclusivity in the interior of the OTP processor in order to place a MAC securing over the postal registers.

The securing of the register values R1, R2, R3, which are stored in a non-volatile NVRAM (see FIG. 1), with a MAC is already implemented in European Application 660 269. The following embodiment expands this register securing in order to intentionally achieve an even higher security of the postage meter machine. Further instances to be additionally secured are:

1. Item counter register R4 with which the following security-associated checks are implemented in the postage meter machine:

Suspicious mode

Printing the R4 value in the postage meter stamp for visual postal monitoring

Sleeping mode.

A manipulation of R4 would place these recited security checks in question and R4 is therefore involved in the following MAC securing of registers.

2. Instances which would require the use of NVRAMs from other postage meter machine.

This version of the invention is based on a postage meter machine that keeps the register data, the serial number and other security-associated data (for example, code word Y, flags) that can be modified during the running time of the postage meter machine, in a NVRAM (see FIG. 1) that is not soldered on the control unit but is plugged into a commercially obtainable socket, so that this NVRAM can be pulled in case of service and read out with a specific service computer in order, for example, to read out register data.

A manipulator could open the postage meter machine and produce copies of this NVRAM or that of a different postage meter machine that contains a consistent data set (money sums, register readings, MACs, security data, flags). The manipulator could then intentionally implement manipulations in the data set, for example, reducing the billed franking value. Given an inspection or at the next remote value loading, this manipulation would be noticed, for example by the checks of the suspicious mode.

When the serial number, which is an unambiguous identification of an individual postage meter machine, and is thus also an unambiguous identification of the data set of the postage meter machine, is involved in the MAC securing of register data, then a data set from a different postage meter machine cannot be used in the NVRAM because the serial number is also burned into other non-volatile memories, for example an EEPROM, that cannot be removed from the postage meter machine.

The manipulation would be recognized given a comparison of the various, stored serial numbers and would block the postage meter machine.

In order to achieve this increased security, the following registers are secured with a MAC and are thus secured against manipulations:

Remaining the sum register R1

Prescribe the sum register R3

Item number register R4

Machine number Nr.

The principle of this MAC generation is shown in FIG. 10.

After every modification of the registers, for example, after each franking, the MAC is recalculated by encrypting the registers with the cryptographic function (block 60), such as data encryption standard (DES), (block 63) using the secret code $K_{reg}$. The result of the encryption, the MAC, is stored in the data area 50$a$ reserved for it in the NVRAM.

Like the other postal registers, the register-MAC is multiply stored in the NVRAM and is stored for specific events in the EEPROM since this allows only a limited number of memory cycles.

FIG. 11 shows the fundamental execution of a check with the postage meter machine switched on. During the running time of the postage meter machine, the microprocessor system can form the MAC (step 1027.4) about the memory area 50$a$ to be checked (step 1027.1) according to the same cryptographic checksum method (step 1027.2) at the times of start security check 1020, before every franking (franking mode 400) and before every remote value prescription (communication mode 300), using the same secret code (block 63, (step 1027.3)) and compares this generated MAC (step 1027.4) to the MAC (T1) taken (step 1027.5) in step 1027.6.

Given a negative comparison (step 1027.7), appropriate measures (step 1030) can then be taken that prevent further operation of the postage meter machine.

Figure 5:
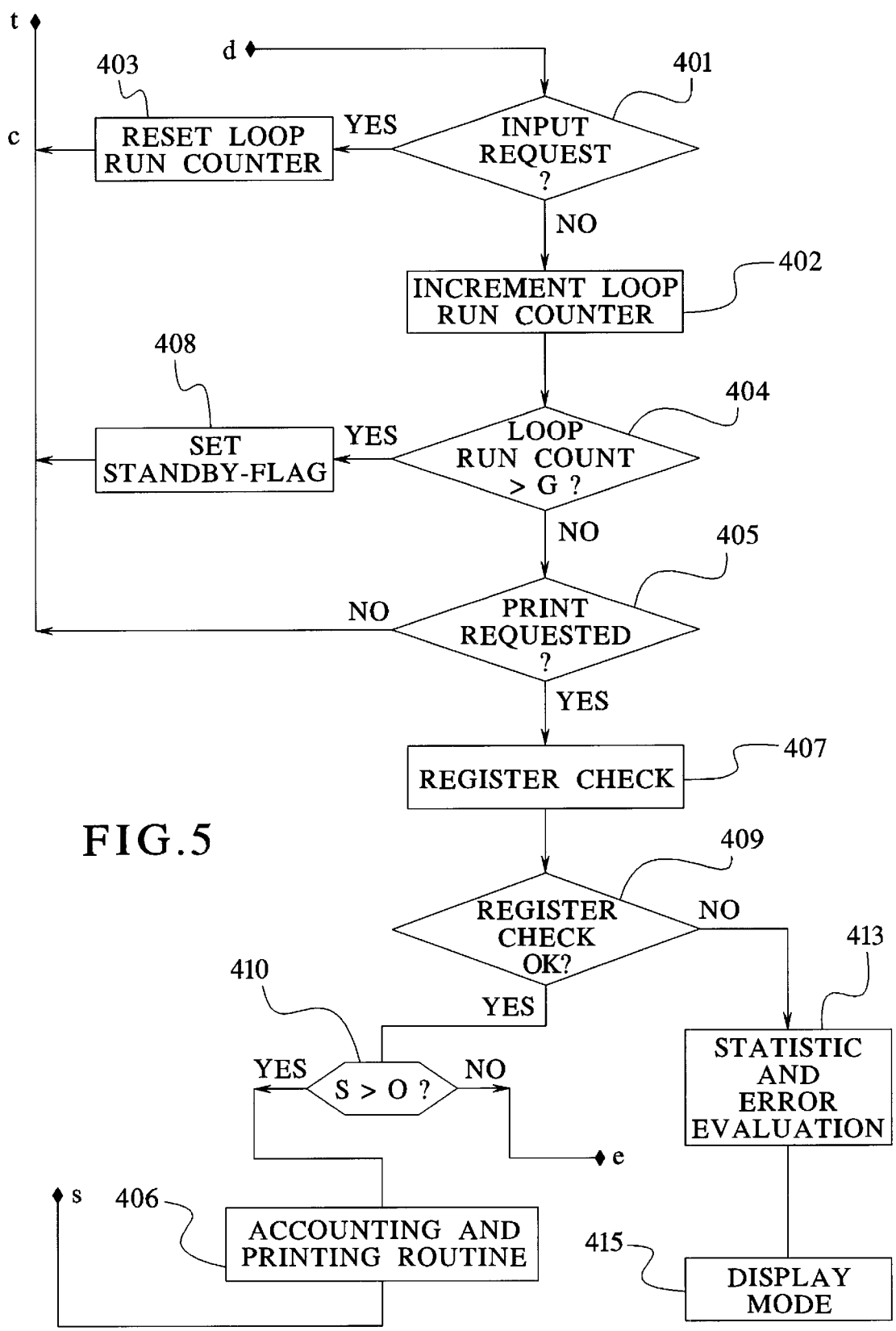
FIG. 5 is a flowchart for the franking mode of FIG. 3.

FIG. 5 shows the flowchart for a franking mode with inventively integrated check steps that are implemented before printing. These likewise protect the security of selected postal data values set forth in greater detail in FIGS. 10 and 11 in an electronic postage meter machine with a MAC.

The explanation of the steps after the franking mode— shown in FIG. 5—ensues based on the block circuit diagrams of FIGS. 1 and 2 and the flowcharts of FIGS. 3 and 4.

The invention proceeds on the basis that, after power-up, the postal value in the value stamp is automatically prescribed corresponding to the last input before the power-up of the postage meter machine and the date in the date stamp is automatically prescribed according to the current date, and that the variable data for the imprint are electronically embedded into the fixed data for the frame and for all appertaining data that have remained unmodified. These variable data of the window contents are referred to in brief below as window data and all fixed data for the value stamp, the date stamp and the advertising imprint stamp are referred to as frame data. The frame data can be obtained from a first memory area of a read-only memory (ROM) that simultaneously serves as the program memory 11. The window data are taken from a second memory area and are stored in memory areas $B_j$ of the non-volatile main memory 5 according to the input. A step 1040—shown in FIG. 4—is provided for such an imprint or franking format processing. This step includes an automatic routine for calling picture element data files, the allocation and embedding of pixel image data of the fixed and semi-variable as well as variable print image data. The appertaining program is stored in the program-EPROM or in the internal OTP-ROM. Since no program branch to program parts stored in the external program-EPROM ensues up to step 1040, no manipulation of the production of the print image can ensue.

The data, of course, can be taken from the aforementioned memories at any time during the running time of the postage meter machine for the purpose of creating a new composition to form an overall format of the franking format. It is thus provided in a preferred modification that the hexadecimal window data are transmitted in run-length-coded form into the respectively separate memory areas $B_1$ through $B_4$ of the non-volatile main memory 5a and are stored therein. Moreover, the time in the clock/date module 8 continues to run constantly even when the postage meter machine is turned off. When, thus, the step 401 in the franking mode 400 is reached, data already stored are accessed after the power-up of the postage meter machine, possibly without manual or renewed external data input. This setting relates, in particular, to the most recent setting of the postage meter machine with respect to the postage amount that is displayed in step 209 before the editing of the printing data ensues. The current, variable pixel image data (date and postage value) are thereby embedded into the fixed frame pixel image data. An interrogation of the input means for potential, further inputs subsequently ensues in step 301 of the communication mode 300 or in further steps such as, for example, in step 401 of the franking mode 400.

In step 209, the data from the aforementioned memory areas are compiled according to a predetermined allocation to form a pixel print image, before printing. The variable information in the window provided for that purpose can be subsequently supplemented and modified. In order to save time, only the parts of a graphic presentation that are in fact modified are newly stored in the non-volatile main memory given a modification. A first memory area A (among other things, for the data of the constant parts of the franking format) is present in the program memory 11 and a further memory area Aai (for the advertising imprint frame) is present in the imprint-EPROM. The sub-memory areas $A_j$, $A_{Aj}$ are provided for i=(1-m) frame or fixed data, whereby an allocated index i identifies the respective frame that is preferably allocated to a specific cost center. The corresponding allocation of the respective cost center to the frame data is automatically interrogated after power-up. In a modification proposed in European Application 658 861, the cost center can be automatically allocated by entering an imprint number after each selection of a user-associated imprint and can be entered into the memory area C. In another version (not shown), the cost center must be entered anew into the memory area C during the start routine after every power-up.

All alphanumerical characters or symbols are deposited pixel-by-pixel as binary data in the character memory 9. The data for alphanumerical characters or symbols are stored in the form of hexadecimal numbers in the non-volatile main memory 5. As soon as the number of the cost center is present as a stored entry in the memory area C, the compressed data from the program memory 11 are converted using the character memory 9 into a print image comprising binary pixel data. The print image is stored in decompressed form in the volatile main memory 7. For explaining the invention, main memories 7a, 7b and pixel memory 7c are employed below, even though, physically, a single memory is preferably used. Based on security considerations, the critical image-generating program steps will sequence in the internal OTP-RAM, and thus cannot be manipulated.

The memory areas in the non-volatile main memory 5 can contain a number of sub-memory areas in which the respective data are stored in data sets. The sub-memory areas $B_j$ are provided for j=(1-n) window data, whereby various allocations between the sub-memory areas of the various sub-areas are stored in a predetermined manner.

Control code and run-length-coded frame or window data are alternating contained in succession in every data set of a sub-memory area $A_j$, Aai, $B_j$. Before printing, the respective selected fixed data are transferred in step 209 into a first register 701, 711, 721, . . . , of the volatile main memory 7a, whereby control codes are decoded during the transfer and are stored in a separate memory area of the main memory 7b. Likewise, the respective, selected window data for the postal stamp and the value stamp are loaded into a second register 702, 712, 722, . . . . Preferably, the registers are formed by sub-memory areas in the memory area of the main memory 7a. In the preferred version, these aforementioned registers are a component of the microprocessor control unit 6. By decompression, the run-length-coded, hexadecimal data are converted into corresponding, binary pixel data.

The invention also includes an implementation of authenticity checks in the result of the print data input in step 1040 for frame and/or window data during the start and initialization routine 101 and in step 209 for security-associated window data which were modified in the printing data input, wherein steps for preventing a further program execution or, a program branch leading out of the OTP processor in the aforementioned system routine (200) are implemented given a lack of authenticity. Steps for further program execution within the aforementioned system routine (200) are implemented given authenticity.

Figure 14:
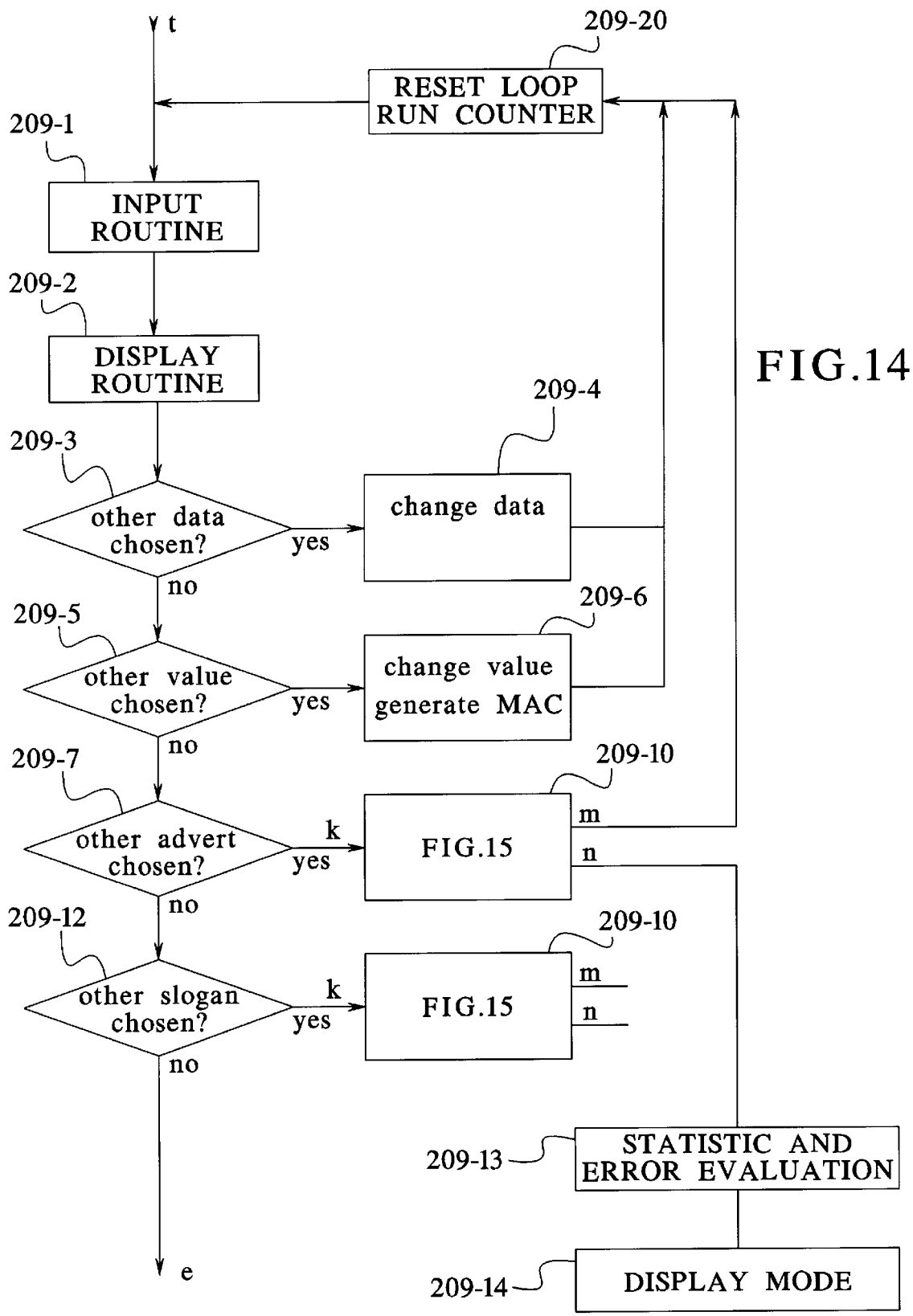
FIG. 14 is a flow chart for securing security-associated data in a freely accessible memory in an electronic postage meter machine, in accordance with the inventive method.

FIG. 14 shows a flow chart for securing security-associated data in a freely accessible memory in an electronic postage meter machine. An input for modifying window data ensues in step 209-1. The input is displayed in step 209-2 and a branch is then made to a first check step 209-3 from a number of check steps 209-3 through 209-12. For example, printing data of the value stamp and other data such as, for example, location of the sender, postal area code of the sender, etc., those are to be protected against manipulation on the basis of the method set forth in FIG. 14, are located in the external program memory (EPROM). The check steps allow a branch to one of the steps 2094 through 209-11 when a different value, slogan, imprint or other data were selected during the input. The method affords adequate security, even though the MAC is formed only over the corresponding to the selection area in the EPROM that contains data. Via a step 209-20 for resetting the loop counter, a branch is subsequently made back to step 209-1. When all check steps 209-3 through 209-12 have been run without modification or, upon the selection of a new value or new data, then point e is reached.

The method disclosed in European Application 0 660 269, wherein the check of the program with MAC ensues only once at the beginning of the running time of the postage meter machine, is inventively improved by additional security checks of the individual, subsequently modified window data. Advantageously, a subsequent replacement of the EPROM data can now be recognized during the running time of the operating postage meter machine. A manipulation or insertion of manipulated data at the moment when the data are to be read-in is thus rendered impossible.

Figure 15:
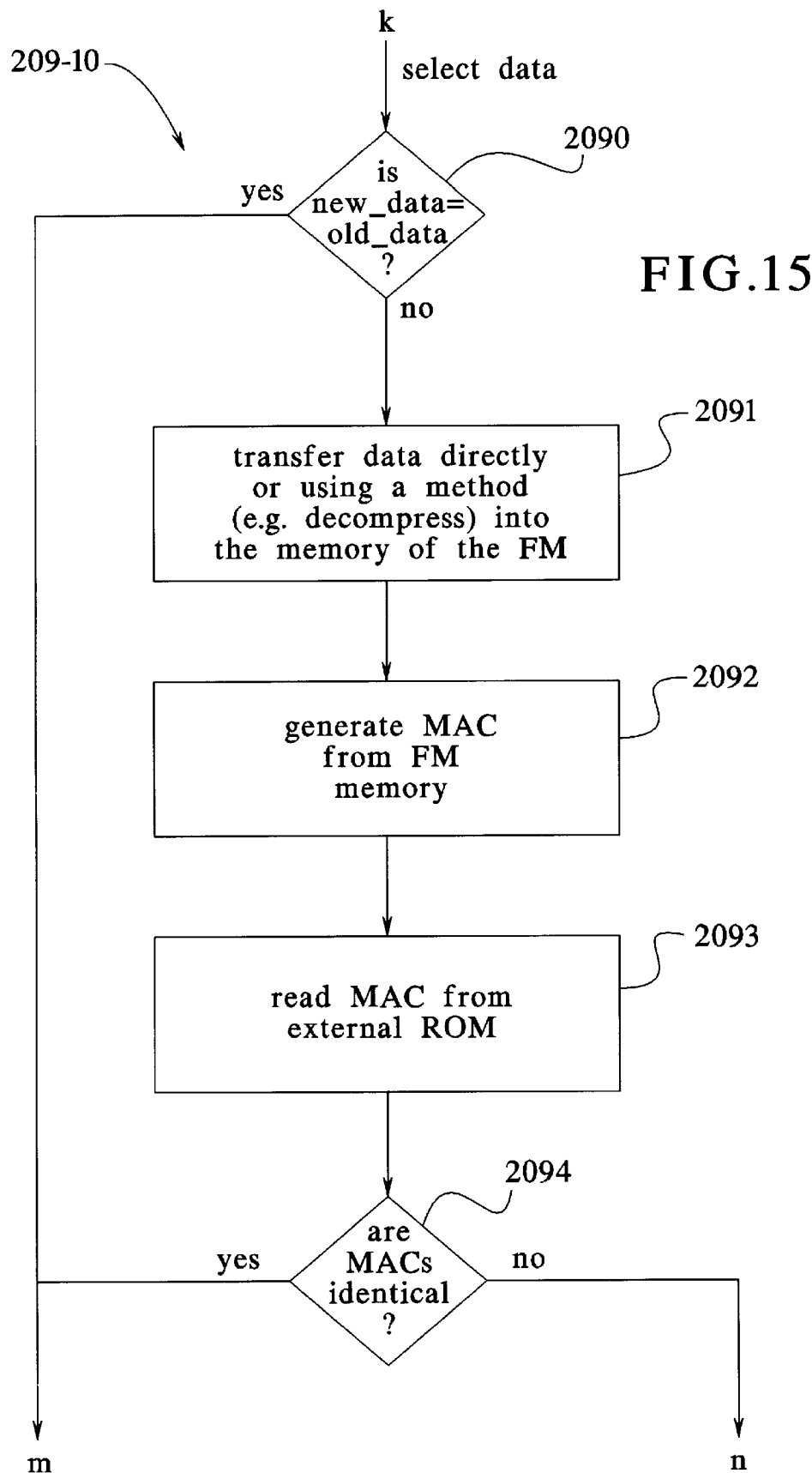
FIG. 15 is a flow chart showing details of one of the steps in the flow chart of FIG. 14.

Steps 209-10 or 209-11 are set forth in greater detail in FIG. 15. When no new input is recognized (step 2090), a branch is made back to step 209-20. Before the application of the MAC, the external EPROM data to be secured are completely loaded into the memory of the postage meter machine (step 2091) and a MAC is subsequently formed (step 2092) over this RAM area. In step 2094, this MAC is compared to a precalculated MAC (step 2093) that is deposited at a suitable location, preferably in the external EPROM. The advantage of this modification is that only those data are employed in the postage meter machine that have withstood the security check, since the externally accessible EPROM, and thus the data for the check and the further-processing, are read only once. This procedure prevents data from being subsequently manipulated (for example, by switching the external EPROM) since these data are read only once for forming MAC and for further-processing.

When the comparison of the just-formed MAC and the reference MAC, which is preferably located in the external RAM, is negative, then suitable measures can ensue. For the purpose of error evaluation and display, a branch is preferably made via step 209-13 to step 209-14. The external data that are not simultaneously required in the postage meter machine can be stored in the external EPROM memory divided according to data sets. This method allows a time-saving in the checking of the external data because a MAC need only be formed over a sub-area and compared to that stored in the EPROM. The memory required for the check of the MAC in the postage meter machine is thereby reduced in size. When, for example, five external data areas (advertising slogan, selective imprints or the like) exist, then only one-fifth of the overall data set need be transferred into the internal memory (lower memory requirement) and only approximately one-fifth of the time is required for forming the MAC. A check thus need not ensue over all four data areas. Dependent on the number of data areas to be secured, the same number of reference MACs is also located in the external memory (EPROM or ROM). In other modifications, the MACs can be located in the NV-RAM of the postage meter machine or even in the internal ROM of the postage meter machine. When the MACs are deposited in the internal NV-RAM, this also has the advantage that a non-secured external EPROM or ROM can be authorized by entering a code into the postage meter machine. As a result thereof, no fixed ciphers need be utilized in generating the external ROMs. Each postage meter machine can have its own cipher available to it for generating the MACs.

The security of this new method is thus based on the use of one or more inaccessible methods (for example, DES) and/or one or more inaccessible ciphers for the formation of the MAC, these being located in the internal OTP-ROM of the postage meter machine. The same ciphers or the same methods have also been employed for the MACs stored in the ROM in the production of the ROM.

Given the employment of this method for securing compressed imprint data, the MAC is formed via the uncompressed data in the RAM. As a result thereof, a further saving in memory space is achieved since compressed and uncompressed data need not be simultaneously deposited in the memory of the postage meter machine.

In another modificaton, the external data can be present in uncompressed form, whereby the data are then directly transferred into the internal memory and the MAC is then formed over the internal memory or parts thereof. The separate securing of the individual imprint parts has, additionally, the advantage that the time requirement for checking the MAC when selecting an imprint remains low, since only those imprint parts that are required at the moment are checked. Only one MAC is provided for the check of the data in an imprint memory (for example, ROM) and every individual imprint (advertising slogan or other parts, e.g. postage paid) has its own MAC.

In addition to imprint data, other data to be introduced into the postage meter machine can be secured by this method. These data can be located in an external ROM, in an external RAM, in an external NV-RAM or on a chip card or any combination of the aforementioned. The check again ensues only after the transmission of the data into the internal memory of the postage meter machine. When it is found in step 209-11 that the MACs are not identical, then, as in the present instance, the error can be displayed in step 209-14 and the machine can be subsequently blocked. Another possibility, for example when securing imprint data, is to print a standard imprint for this instance that indicates a manipulation. This imprint can thereby be printed instead of or in addition to the manipulated imprint. It is also possible to modify a different imprint (data, value) such that a manipulation can be recognized.

Once retrieved, the constant parts of the franking format are available constantly decoded in the pixel memory area I in the volatile pixel memory 7C. For fast modification of the window data, a second memory area B exists in the non-volatile main memory 5.

The data blocks that are entered with a keyboard 2 or via an electronic scale 22 that calculates the postage value and is connected to the input/output unit 4, and which are required for generating the input data, are automatically stored in the memory area D of the non-volatile main memory 5. Moreover, datasets of the sub-memory areas, for example B$_j$,C, etc. are preserved. It is thus assured that the last-entered quantities are also preserved when the postage meter machine is shut off, so that the postage value according to the last input before the shut-off of the postage meter machine and the date in the date stamp corresponding to the current date are automatically prescribed upon power-up. When a scale 22 is connected, the postage value is taken from the memory area D. A check is carried out in step 401 to determine whether an input is present. A branch is made back to step 209 given a renewed input request in step 401.

Otherwise, a branch is made to step 405 via the steps 402 and 404 for incrementing a run counter and for checking the number of runs, in order to wait for the print output request. The letter to be franked is detected by a letter sensor and, thus, a print request is triggered. A branch can thus be made to the accounting and printing routine in step 406. When no print output request in step 405 is present, a branch is made back to step 209 (point t).

When, according to the preferred version shown in FIG. 5, a branch is now made back to point t and step 301 is reached, a communication request can be produced at any time or some other input can be actuated according to the steps for changing data 209, test request 212, register check 214, as well as input request 401. Steps 401–404 as in the version according to FIG. 5, are now executed again. Given a predetermined number of runs, a branch is made from step 404 to step 408. The alternative interrogation criteria can be interrogated in step 404 in order to set a standby flag in step 408 when a print output request is not yet present after a predetermined time. As already set forth above, the standby flag can be interrogated in step 211 following the communication mode 300. A branch is thus not made to the franking mode 400 before the check has shown the full complement of all, or of at least selected, programs.

When a print output request is recognized in step 405, further interrogations are actuated in the following steps 409 and 410 as well as in 406. For example, the presence of authenticated registered values (FIG. 11) is interrogated in step 409 and the reaching of a further item count criterion is interrogated in step 410 and the register data used in a known way for accounting are interrogated in step 406. As already set forth with reference to FIG. 10, moreover, a securing of selected registers in the NVRAM of the postage meter machine is implemented by MAC formation. If the predetermined number of frankings was reached in the preceding franking, i.e. the franking number is equal to zero, a branch is automatically made from step 410 to point e, in order to enter into the communication mode 300 so that the data central again credits a new, predetermined item number S. If, however, the predetermined franking number was not yet reached, a branch is made to the calculating and printing routine in step 406 from step 410. A specific sleeping mode counter is initiated to count one further counting step in step 406, i.e. during the accounting routine ensuing immediately before printing. Ukewise, the number of printed letters and the current values in the postal registers corresponding to the input cost center are registered, in non-volatile memories 5A, 5B of the postage meter machine in the accounting routine 406 and are available for later evaluation.

The register values can be interrogated in the display mode 215 as needed. It is likewise provided that the register values or other service data be printed out with the printing head of the postage meter machine for accounting or monitoring purposes. This, for example, can likewise ensue as does the normal printing of the franking format, however, a different frame is initially selected for the fixed image data wherein the variable data corresponding to the register values stored in the non-volatile memory NVM 5 or, in the cost center memory, are inserted. This can be done similar to the manner disclosed in German published Application 42 24 955 for the formation and presentation in three multi-line information groups or for a required switching into a corresponding mode. Contrary to the approach of German published Application 42 24 955, the data when a rotated illustration is requested are already directly deposited in rotated form in the volatile memory in a manner as required for printing. The time-consuming routine of rotating the printing data is implemented only once for an additional picture element data file in the programming of the EPROM at the manufacturer, which only requires more memory space but no increased calculating performance in the postage meter machine.

It is also provided in another modification that variable pixel image data are embedded into the other pixel image data during printing. Corresponding to the position report supplied by the encoder 13 about the feed of the postal matter, or of the paper strip, in relationship to the printer module 1, the compressed data are read from the main memories 5a and 5b, and are converted with the assistance of the character memory 9 into a printing image comprising binary pixel data, this printing image being likewise stored in this decompressed form in the volatile main memory 7. Further details may be derived from European Applications 576 113 and 578 042.

The pixel memory area in the pixel memory 7 is thus provided for the selected decompressed data of the fixed parts of the franking format and for the selected decompressed data of the variable parts of the franking format. The actual printing routine (in step 406) ensues after the accounting.

As proceeds from FIG. 1, the main memory 7 and the pixel memory 7 are in communication with the printer module 1 via a print controller 14 including a print register (P$_{Reg}$) 15 and output logic. The pixel memory 7 has its output side connected to a first input of the printer controller 14, which has other control inputs at which output signals of the microprocessor control unit 6 are present.

When all columns of a print image have been printed, a branch is made back to the system routine 200.

Upon transition into the system routine 200—FIG. 3—, a check is first carried out in step 202 following a further step 201 for data retrieval particularly sleeping mode item number data, to determine whether the criteria for entry into the sleeping mode are met. When this is the case, a branch is made to step 203 in order to display at least one alarm with the display unit 3. Further steps 204 through 206 can thereby be executed before a branch is made to step 209. When this is not the case, however, a branch is likewise made to step 209. In any case, the point t is reached following the steps.

After an ensuing new input and input/display routine with printing data compilation and retrieval of the required picture element data files in step 209, point e, i.e., the beginning of a communication mode 300, is now reached assuming that no relevant deficiencies were found. To that end, an inquiry is made in step 301 to determine whether a transaction request is present. When this is not the case, the communication mode 300 is exited at point f, i.e., the operating mode 290 is reached. If relevant data were communicated in the communication mode, then a branch is to be made to step 213 for the data evaluation. Otherwise, if non-communication was found in step 211, a branch is made to step 212. A check is now carried out to determine whether corresponding inputs have been made in order, given a test request 212, to proceed into the test mode 216 or into a display mode 215 if a check 214 of the register readings is intended. When this is not case, point d, i.e, the franking mode 400, is automatically reached.

It is also inventively provided that a statistics and error evaluation is implemented in step 213 in order to acquire further current data that can likewise be retrieved in step 201 after branching to the system routine 200.

When point e, i.e., the beginning of the communication mode 300 set forth below, has been reached, an inquiry is made in step 301 to determine whether a transaction request is present. This can be made, for example, for reloading credit and item number or for updating other relevant data.

The user selects the communication or remote value prescription mode of the postage meter machine by the input of the identification number (8-place postage call number) and via the actuation of the predetermined T-key. When the desired input parameter is properly displayed, this is confirmed by renewed actuation of the predetermined T-key of the input means 2. The input parameter is edited as needed. A presentation corresponding to the input then appears in the display unit 3.

By actuating the predetermined T-key, the transmission of the input parameter via modem connection is started and the input is checked. The further operation proceeds automatically, whereby the execution being accompanied by a corresponding display.

To that end, the postage meter machine checks whether a modem is connected and operational. When this is not the case, a branch is made to step 310 in order to display that the transaction request must be repeated. Otherwise, the postage meter machine reads the selection parameters composed of the election parameters (main/extension, etc.) and the telephone number from a NVRAM memory area F and sends this together with a selection request command to the modem 23. The call set-up required for the communication subsequently ensues via the modem 23 to the data central station. If a predetermined number (n) of unsuccessful selection repetitions for the purpose of a call set-up occurs, a branch is made back to point e via a display step 310.

A transaction implemented during the communication with encrypted messages has a prescribed value for a credit reloading value that is communicated to the remote data central; and the transaction implemented during the communication with encrypted messages has a specific item number S' for a sleeping mode.

One of the transaction requests leads to a specifically secured credit reloading in the postage meter machine. The securing of the postal registers which are present outside the processor in the cost center memory preferably also ensues during the credit reloading with a time control. When, for example, the postage meter machine is operated (manipulated) using an emulator/debugger, then it is probable that the communication and accounting routines will not sequence within a predetermined time. When this is the case, i.e., the routines require substantially more time, this would be recognized in the postage meter machine and, consequently, critical memory areas will be irretrievably erased. The postage meter machine is thus prevented from continuing to operate.

Relevant ciphers (crypto keys) are required from the communication of the data required for a credit reloading and/or item number reloading, these having been deposited in encrypted form in the memory. The principle of the securing concept is shown in FIGS. 12 and 13.

An application of the DES algorithm preferably ensues using the crypto keys required for the remote value prescription in order to deposit this value in encrypted form. The data transmission of the postage meter machine to the data central in the communication mode 300 is likewise secured with a DES algorithm, a secret DES crypto key being required for this purpose. This secret DES crypto key is formed in the communication mode 300 be decoding the encrypted crypto keys during the running time of the postage meter machine, i.e., during the communication mode 300, in the OTP in order to load a secret crypto key KAct into the internal OTP-RAM.

Figure 12:
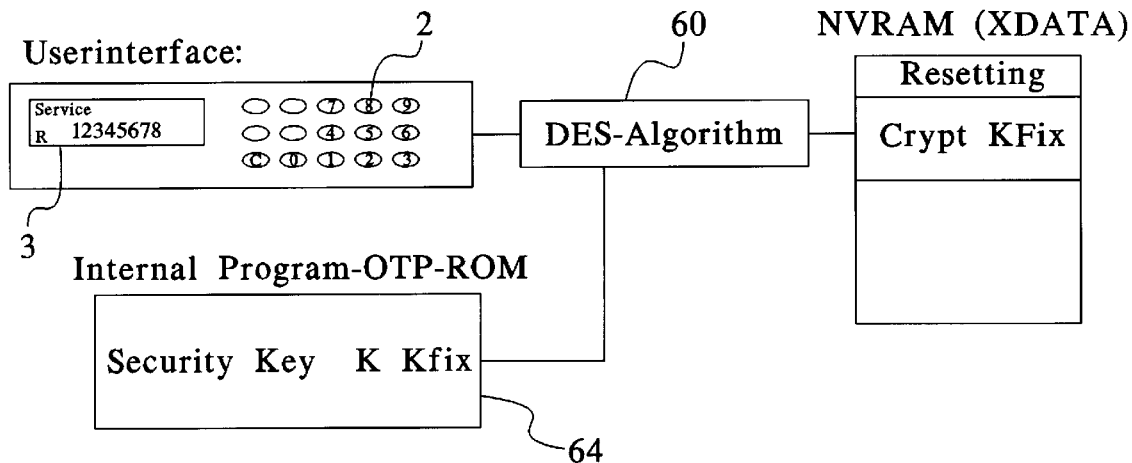
FIG. 12 is flowchart for input encryption of the ciphers that are utilized for the protected transmission of data between postage meter machine and data central station in accordance with the inventive method.
Figure 13:
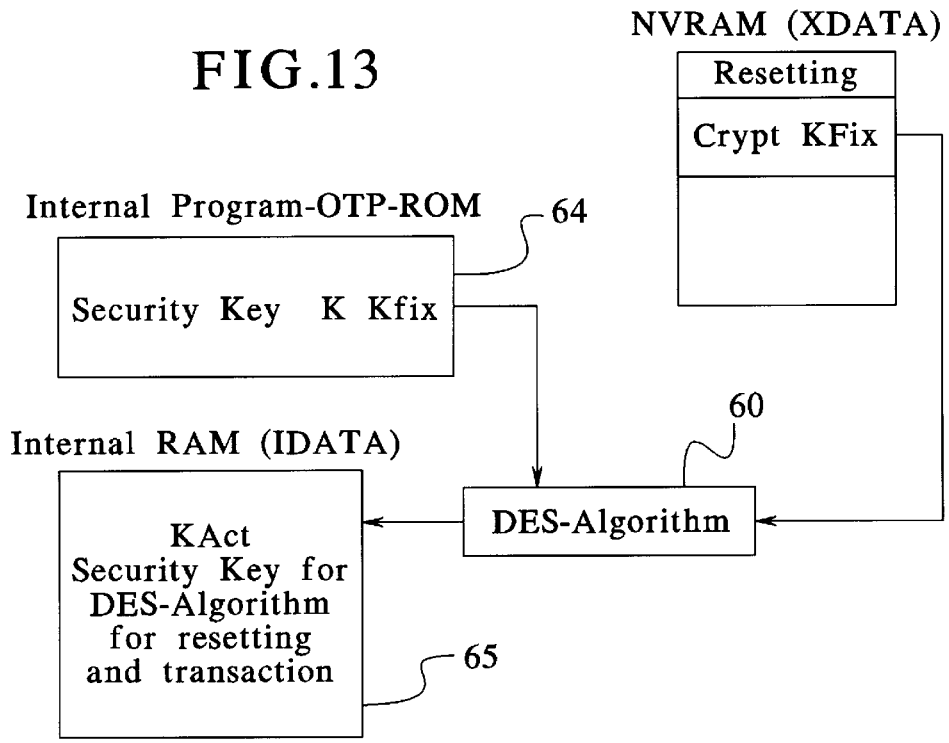
FIG. 13 is a flowchart for the decoding of the ciphers for the remote value input in accordance with the inventive method.

FIG. 12 shows the input encryption of the remote value prescription DES crypto key $K_{Fix}$ for securing the remote value prescription DES crypto key $K_{Fix}$ against manipulation.

During manufacture or during service by an authorized technician, each postage meter machine receives a fixed remote value prescription crypto key $K_{Fix}$ via its user interface 2, 3 that must be kept hidden in the NVRAM. For that purpose, the remote value prescription crypto key is encrypted in step 60 with the cryptographic function, data encryption standard (DES) using the secret crypto key $K_{Kfix}$ stored in the OTP-ROM (step 64). The encrypted crypto key $K_{Fix}$ is now deposited in the external data memory NVRAM.

The steps which must be implemented during the running time of postage meter machine for a remote value prescription so that the DES crypto key KAct is formed from the encrypted key $K_{Fix}$ value in the external NVRAM, that is held in the processor-internal RAM for the time of the remote value prescription procedure, are shown in FIG. 13. The secret crypto key $K_{Fix}$ is taken from the internal OTP-ROM (Block 64) and the encrypted crypto key crypt $K_{Fix}$ is taken from the NVRAM. Block 60 of FIG. 13 shows the decoding of the DES crypto key $K_{Fix}$ and a storing in the internal OTP-RAM for the remote value prescription in Block 65.

The postage meter machine implements the register check regularly and/or upon power-up and can thus recognize the lacking information when the machine had been opened in unauthorized fashion. The postage meter machine is then blocked.

The potential manipulator of a postage meter machine must overcome a number of thresholds, this, of course, requiring a certain time. When no connection from the postage meter machine to the data central is set up within certain time intervals, the postage meter machine already becomes suspect. It is assumed that the person who is guilty of a manipulation at the postage meter machine will not report to the data central station.

The control unit 6 is a microprocessor or an OTP processor. In addition to a microprocessor, non-volatile memories and further circuits are accommodated in a common housing in the OTP. The internal, non-volatile memory, for example, includes program memories and, in particular, also allows the possibility of setting security bits that prevent the read-out of the internal non-volatile memory toward the outside. These security bits are set in the OTP during the manufacture of the postage meter machine. Following such security-associated routines such as, for example, accounting routines with an emulator/debugger would likewise lead to a modified time execution which can be identified by the OTP processor. This also includes a clock generator/counter circuit for the prescription of time intervals or clock cycles, for example, for the time-out generation or printer control. When a specific time has elapsed and the anticipated event has not occurred, the clock generator/counter circuit generates an interrupt that reports the result-free expiration of the time span to the microprocessor, whereupon the microprocessor initiates further measures. Inventively, the clock generator/counter circuit is utilized for monitoring program running time. A known number of clock cycles for the program execution of predetermined program parts is thereby used. Before the start of the routine, the counter of the clock generator/counter circuit is pre-set or reset in a predetermined way. After the start of the program routine, the counter reading is continuously modified corresponding to the clock pulses of the clock generator. After processing the critical, predetermined program parts, the status of the counter is interrogated by the microprocessor and is compared to the anticipated value. When a predetermined deviation in the running time of critical or, respectively, security-associated program parts is exceeded, the postage meter machine can thus no longer be operated for franking (kill mode 1). When a manipulator performs an unauthorized operation, the postage meter machine is effectively shut down during the running time by being converted into the first mode.

The register readings are checked during an inspection. As needed, a test impression with the value 0 can be made. Given repair by service on site, operations may potentially be performed on the postage meter machine. The error registers, for example, can be read out with the assistance of a specific service EPROM that is plugged-in instead of the advert-EPROM. If this EPROM plug-in location is not accessed by the processor, access to the data lines is prevented by specific driver circuits (buffers) shown in FIG. 2. The data lines, which can be reached through a unsealed housing door, can thus not be tapped in an unauthorized fashion. Another possibility is to undertake the read-out of error register data by a service computer connected via an interface, whereby the interface must then have corresponding security measures.

During times in which printing is not carried out (standby mode) that an inquiry ensues in view of manipulation attempts and/or the checksum of the register readings is formed and/or is formed over the content of the program memory PSP 11. In order to improve the security against manipulation, the checksum is thereby formed for a kill mode 2 in the OTP over the content of the external program memory PSP 11 and the result is compared to a predetermined value stored in the OTP. This preferably ensues in step 101 when the postage meter machine is started or in step 213 when the postage meter machine is operated in standby mode. The standby mode is reached when a predetermined time elapses without an input or a print request. The latter occurs when a letter sensor of a known type—not shown in detail—does not identify a next envelope that is to be franked. Step 405—shown in FIG. 5—in the franking mode 400 therefore also includes a further inquiry about a time lapse, whereby a time transgression ultimately leads again to point e, and thus to the input routine according to step 209. When the interrogation criterion is met, a standby flag is set in step 408 and a direct branch is made back to the point s to the system routine 200 or the point t without running through the accounting and printing routine in step 406. The standby flag is interrogated later in step 211 and is reset in step 213 after the checksum check when no manipulation attempt has been recognized.

To this end, the interrogation criterion in step 211 is expanded by determining whether the standby flag is set, i.e., whether the standby mode has been reached. In this case, a branch is likewise made to step 213. The advantage of this method in conjunction with the first mode is that the manipulation attempt is statistically acquired in step 213.

In order to further enhance the security against manipulations, a flow control is inventively utilized that is set forth below. Such a flow control ensues by modifying a numerical value in a memory at at least one point during the implementation of the program routine. After the execution of the program routine, the modified numerical value is compared to a predetermined numerical value allocated to this program routine. When branchings are executed during the program run, different numerical values will result. A plausibility test is implemented in a following evaluation or a determination can be made as to what branchings were executed. This is achieved by the modification of the numerical value ensuing by a multiplication by a specific prime number allocated to the respective program part. A prime number resolution merely has to be implemented then in a later evaluation.

In another version wherein only those program parts without branchings are taken into consideration or wherein no tracking of the program branches which were executed is required, an incrementing of the numerical value and subsequent comparison to at least one predetermined numerical value is then adequate.

The overall flow chart shown in FIG. 3 for a security system comprises steps 201 through 206 for monitoring further criteria. Given an infringement of one of the security criteria, the postage meter machine enters into a sleeping mode, for example, when a connection to the data central has not yet been set up after using a predetermined item number.

The postage meter machine and the data central agree on a predetermined item number s, i.e., the amount that can be franked up to the next communication set-up. When a communication does not occur (item number monitoring), the postage meter machine slows down its operations (sleeping mode version 1).

Another version provides a constant warning for the impending entry into the sleeping mode step 203. This must be constantly executed in step 202 due to the satisfied interrogation criterion before step 205 is reached. The step 203 includes a sub-step for error statistics corresponding to the statistics and error evaluation mode 213.

As disclosed in U.S. Pat. No. 3,255,439, the postage meter machine requests a connection to the data central station. When the connection is set up, the data central station checks the register readings. When the reloading cannot be undertaken, the data central station prevents further operation of the postage meter machine with a signal communicated to the postage meter machine. If the connection arose shortly after the signaling undertaken by the postage meter machine and the register readings are not objected to, the postage meter machine can be switched back into the operating mode without another unscheduled inspection. To this end, new current data, for example for a credit and for the allowed number of items that can be franked up to the next set up of a connection, are communicated.

On the basis of the signaling code communicated, the data central can distinguish between automatically undertaken and normal communication. The former will always ensue when the user of the postage meter machine has overlooked or ignored the requests to communicate and fails to implement appropriate input actions. When this is repeated and given suspicion of a manipulation, an unscheduled inspection can thereby be arranged.

A return directly to the communication mode 300 point e can be made from the franking mode. Other inputs, for example according to the steps of test requests 212 or register check 214, can also be actuated. Only when a branch is made to the franking mode 400 is a finding made again in step 410 corresponding to the decision criterion as to whether an automatic communication is required. This is preferably the case when the predetermined item number has been used.

When the communication was successful and data were communicated (interrogated in step 211), step 213 is likewise reached. The current data are identified or loaded in step 213, this being data retrieved in step 201 and being subsequently required again during the comparison in step 202. The decision criterion that is communicated is preferably the new item number S'.

In an alternative version the decision criterion is the new credit communicated for franking and the new item number S' is internally identified in the postage meter machine in the evaluation mode 213. In this case, the communication with the data central no longer covers the new item number S' but is only required for triggering the calculation in the evaluation mode 213. The calculation ensues internally in the postage meter machine and simultaneously therewith in parallel in the data central according to the same methods on the basis of the communicated register data.

The postage meter machine can communicate the following register values to the data central before a credit reloading:

R1 (descending register) remaining amount on hand in the postage meter machine;

R2 (ascending register) aggregate used amount in the postage meter machine;

R3 (total resetting) the previous total prescribed sum of all remote value prescriptions;

R4 (piece count sum printing with value unequal to 0) plurality of valid impressions; and R8 (R4+piece count sum printing with value equals 0) plurality of all impressions.

Following therefrom: R3=R2+R1

R1 can be interrogated and statistically evaluated at every remote value prescription. When R1 becomes continuously larger, then the same reloaded amount can be reloaded at larger and larger reloading periods, or the item number that is allowed to be franked up to the next communication is set lower.

A postage meter machine profile can be produced on the basis of the data associated to a specific postage meter machine. This postage meter machine profile provides information as to whether a customer was in the position with the implemented reloading events to carry out the identified number of frankings. Two stages are to be distinguished within the suspicious mode:

1. Postage meter machine is suspicious; and
2. Postage meter machine must have been manipulated.

A plausibility check of all postage meter machines in operation is implemented at regular intervals in the data central. In this method, the machines whose franking behavior seems suspicious or that have been manipulated are identified and reported to the postal authority. Yet another security measure (error overflow mode) is potentially provided in the postage meter machine. This can be implemented in the second mode in addition to or instead of the sleeping mode version 1 or sleeping mode version 2. When the interrogation criterion in step 202 is met, i.e. when a predetermined number of errors is exceeded, the reaction time span of the postage meter machine slows down in step 203, whereby this condition is simultaneously reported to the user of the postage meter machine via the display. Procedures similar to those set forth in conjunction with FIGS. 2 and 5 can be carried out in the further steps. The postage meter machine stores both internal and operating errors and manipulation attempts in an error register for reporting purposes, for example up to the number 999. When the cause of the excess number of errors has not been eliminated, for example, within an inspection by a service technician or by resetting during a communication with the data central station, the reaction time span can be increased further in order to make potential manipulations more difficult. The number of errors then continues to be reported, i.e., again up to a predetermined number, for example, in step 213.

In a first version the reaction time span is linearly increased, for example the time span until printing operations begin, with the number of errors. The execution of the program is thereby neither modified nor prevented, merely retarded. In particular, uncritical program parts that are not monitored by time supervision (kill mode 1) or flow control are multiply executed such as, for example the error display. The effect of the program thus remains essentially unmodified.

In a second version, the reaction time span is respectively increased by one step, whereby the steps can be seconds, minutes, hours, days, . . . etc.

In a modification or in combination with the aforementioned versions, an increase in the reaction time span can also be provided given a malfunctioning. An electronic time lock is actuated for this purpose in one embodiment. A progressive increase in the reaction time span is preferably provided in the operating program in order to make a manipulation more difficult.

Step 213 may be executed as a sub-step partially or entirely in conjunction with other steps. For example, the statistics and error mode is a component of step 203 and the accounting and printing routine according to step 406 in the franking mode 400 that is shown in greater detail in FIGS. 3 and 5. When a serious accounting error occurs, the machine is blocked in step 406. When, however, an error occurs during the initialization phase in step 101, the machine stops at the point of the error and displays a specific error code.

On the other hand, there are serious errors that can only be eliminated on the occasion of the next on site inspection by a person authorized to do so. Such an error, for example, when the processor cannot access the main memory, i.e., the data content of the RAM can neither be read nor modified, is eliminated, for example, by plugging-in a specific reset-EPROM. The seal of the flap and the postage meter machine must be opened for this purpose. The reset-EPROM receives the required data, for example, the corresponding cipher, and specific programs for restoring the postage meter machine are executed. For example, such a program can in turn cancel a reduction in redundancy that has occurred. The reporting of the errors that ensues separated according to error types during the operation of the postage meter machine in the statistics and error evaluation mode (step 213) is subsequently thereby checked by the authorized person to see whether a manipulation attempt had been undertaken.

Although modifications and changes may be suggested by those skilled in the art, it is the intention of the inventors to embody within the patent warranted hereon all changes and modifications as reasonably and properly come within the scope of their contribution to the art.

We claim:

1. A method for securing data and program code in an electronic postage meter machine against manipulation, said electronic postage meter machine having a microprocessor in a control unit for implementing steps of a start and initialization routine upon turn-on of the postage meter machine and for thereafter implementing a system routine including a communication mode with a data central remote from said postage meter machine and a franking mode including an accounting and printing routine in which a franking amount is printed on a postal item and a debiting of the franking amount is made, followed by a branch back to a beginning of said system routine, said method comprising the steps of:

providing an OTP (one time programmable) processor as said microprocessor in said control unit and providing a storage medium accessible by said OTP processor in said postage meter machine;

storing memory contents which may be valid or invalid, in said storage medium, said memory contents including at least one of data and a program code;

conducting a start security check in said OTP processor, upon said turn-on of said postage meter machine, in said start and initialization routine before conducting said system routine, and in said start security check forming an MAC (message authentification code) over at least a portion of the contents of said storage medium and using said MAC to determine the validity or invalidity of said contents of said storage medium over which said MAC is formed, using an MAC check sum sequence; and said OTP processor transferring said postage meter machine into the system routine given validity of said memory contents and transferring the postage meter machine into a first mode and preventing franking by said postage meter machine in said first mode given invalidity of said memory contents.

2. A method as claimed in claim 1 wherein the step of conducting said start security check includes the steps of:

storing a predetermined MAC value in a storage medium external to said postage meter machine;

transmitting said predetermined MAC value from said storage medium external to said postage meter machine to said storage medium in said postage meter machine accessible by said OTP processor;

in said MAC check sum sequence, forming an MAC check sum in said OTP processor using said MAC formed over at least a portion of the contents of said storage medium; and comparing said MAC check sum in said OTP processor to said predetermined MAC value at at least one time selected from the group consisting of before conducting said franking mode, after conducting said franking mode, in said communication mode, and any time at which said postage meter machine is not printing.

3. A method as claimed in claim 1 comprising the additional steps of:

monitoring expiration of a time selected from the group consisting of a time during which no franking of postal items occurs, and a predetermined number of loops of said system routine without any input, and upon expiration of said time said OTP processor placing said postage meter machine in a standby mode; and conducting at least one further security check in said standby mode and, if an error is identified in said at least one further security check, causing said OTP processor to place said postage meter machine in said first mode wherein franking is prevented.

4. A method for securing data and program code in an electronic postage meter machine against manipulation, said electronic postage meter machine having a microprocessor in a control unit for implementing steps of a start and initialization routine upon turn-on of the postage meter machine and for thereafter implementing a system routine including a communication mode with a data central remote from said postage meter machine and a franking mode including an accounting and printing routine in which a franking amount is printed on a postal item and a debiting of the franking amount is made, followed by a branch back to a beginning of said system routine, said method comprising the steps of:

storing an encrypted, first crypto-key in a non-volatile memory externally from said OTP processor;

storing a second crypto-key and a DES algorithm internally within said OTP process;

decoding said first crypto-key using said second crypto-key in said OTP processor to obtain a decoded, first crypto-key; and said OTP processor initiating a communication in said communication mode in which data are communicated to said data central, and said OTP processor securing said data in said communication using the decoded, first crypto-key and said DES algorithm.

5. A method as claimed in claim 4 comprising the additional step of additionally securing said data in said communication in said communication mode with an MAC (message authentification code) formed internally over said data in said communication in said OTP processor.

6. A method as claimed in claim 4 wherein the step of said OTP processor conducting a communication in said communication mode with said data central comprises prescribing a value in said OTP processor for a credit reloading and communicating said value, as said data secured by said decoded, first crypto-key and said DES algorithm, to said data central.

7. A method as claimed in claim 4 wherein the step of said OTP processor initiating a communication in said communication mode with said data central includes said OTP processor receiving criterion, encrypted using said first crypto-key and said DES algorithm, for causing entry of said postage meter machine into a sleeping mode, as said data.

8. A method for securing data and program code in an electronic postage meter machine against manipulation, said electronic postage meter machine having a microprocessor in a control unit for implementing steps of a start and initialization routine upon turn-on of the postage meter machine and for thereafter implementing a system routine including a communication mode with a data central remote from said postage meter machine and a franking mode including an accounting and printing routine in which a franking amount is printed on a postal item and a debiting of the franking amount is made, followed by a branch back to a beginning of said system routine, said method comprising the steps of:

providing an OTP (one time programmable) processor as said microprocessor in said control unit and providing a storage medium accessible by said OTP processor in said postage meter machine;

storing memory contents which may be valid or invalid, in said storage medium, said memory contents including at least one of data and a program code;

conducting a start security check in said OTP processor, upon said turn-on of said postage meter machine, in said start and initialization routine before conducting said system routine, and in said start security check forming an MAC (message authentification code) over at 1 east a portion of the contents of said storage medium and using said MAC to determine the validity or invalidity of said contents of said storage medium over which said MAC is formed, using an MAC check sum sequence;

said OTP processor transferring said postage meter machine into the system routine given validity of said memory contents and transferring the postage meter machine into a first mode and preventing franking by said postage meter machine in said first mode given invalidity of said memory contents; and storing an encryption algorithm and at least one crypto-key associated with said encryption algorithm internally in said OTP processor, and said OTP processor employing said at least one crypto-key and said encryption algorithm for forming said MAC.

9. A method as claimed in claim 8 wherein the step of storing said encryption algorithm comprises storing a DES algorithm.

10. A method for securing data and program code in an electronic postage meter machine against manipulation, said electronic postage meter machine having a microprocessor in a control unit for implementing steps of a start and initialization routine upon turn-on of the postage meter machine and for thereafter implementing a system routine including a communication mode with a data central remote from said postage meter machine and a franking mode including an accounting and printing routine in which a franking amount is printed on a postal item and a debiting of the franking amount is made, followed by a branch back to a beginning of said system routine, said method comprising the steps of:

providing an OTP (one time programmable) processor as said microprocessor in said control unit and providing a storage medium accessible by said OTP processor in said postage meter machine;

storing memory contents which may be valid or invalid, in said storage medium, said memory contents including at least one of data and a program code;

conducting a start security check in said OTP processor, upon said turn-on of said postage meter machine, in said start and initialization routine before conducting said system routine, and in said start security check forming an MAC (message authentification code) over at least a portion of the contents of said storage medium and using said MAC to determine the validity or invalidity of said contents of said storage medium over which said MAC is formed, using an MAC check sum sequence;

said OTP processor transferring said postage meter machine into the system routine given validity of said memory contents and transferring the postage meter machine into a first mode and preventing franking by said postage meter machine in said first mode given invalidity of said memory contents;

upon transfer into said system routine, said OTP processor calling current data and checking said current data with at least one decision criterion and, if said decision criterion is satisfied, causing said postage meter machine to enter into a second mode wherein a warning is displayed at said postage meter machine with a request for initiating a communication with said data central; and said OTP processor causing said postage meter machine to enter into at least one further mode and said OTP processor conducting at least one further security check in said at least further mode.

11. A method as claimed in claim 10 wherein the step of implementing at least one further security check comprises conducting an authenticity check of values stored in accounting registers in said postage meter machine.

12. A method as claimed in claim 10, wherein the step of said OTP processor implementing at least one further security check comprises:

storing security-related data in a non-volatile memory in said postage meter machine; and checking said security-related data at least before entering into said franking mode.

13. A method as claimed in claim 10 wherein the step of said OTP processor implementing at least one further security check comprises the steps of:

identifying a selected portion of said program code; and checking for errors in said selected portion of said program code in said storage medium.

14. A method as claimed in claim 10 wherein the step of said OTP processor conducting at least one further security check comprises:

storing data in an EPROM; and checking for authenticity of said data stored in said EPROM.

15. A method as claimed in claim 10 including the additional steps of:

storing an accounting value in said EPROM; and determining an accuracy of said accounting value as said at least one additional security check.

16. A method as claimed in claim 15 wherein the step of checking the accuracy of said accounting value comprises displaying said accounting value at said postage meter machine.

17. A method as claimed in claim 15 wherein the step of checking the accuracy of said accounting value comprises printing out said accounting value using an internal printer of said postage meter machine which is also employed for said franking said postal items.

18. A method for securing data and program code in an electronic postage meter machine against manipulation, said electronic postage meter machine having a microprocessor in a control unit for implementing steps of a start and initialization routine upon turn-on of the postage meter machine and for thereafter implementing a system routine including a communication mode with a data central remote from said postage meter machine and a franking mode including an accounting and printing routine in which a franking amount is printed on a postal item and a debiting of the franking amount is made, followed by a branch back to a beginning of said system routine, said method comprising the steps of:

providing an OTP (one time programmable) processor as said microprocessor in said control unit and providing a storage medium accessible by said OTP processor in said postage meter machine;

storing memory contents which may be valid or invalid, in said storage medium, said memory contents including at least one of data and a program code;

conducting a start security check in said OTP processor, upon said turn-on of said postage meter machine, in said start and initialization routine before conducting said system routine, and in said start security check forming an MAC (message authentification code) over at least a portion of the contents of said storage medium and using said MAC to determine the validity or invalidity of said contents of said storage medium over which said MAC is formed, using an MAC check sum sequence;

said OTP processor transferring said postage meter machine into the system routine given validity of said memory contents and transferring the postage meter machine into a first mode and preventing franking by said postage meter machine in said first mode given invalidity of said memory contents; and said OTP processor, upon return to said system routine, entering into a printing data call routine for calling data for franking said postal items and conducting at least one check for authenticity of said printing data and, given an absence of authenticity, entering into a program branch externally from said OTP processor in said system routine.

\* \* \* \* \*